US012273656B2

(12) United States Patent
Eirinberg et al.

(10) Patent No.: US 12,273,656 B2
(45) Date of Patent: *Apr. 8, 2025

(54) USER INTERFACES TO FACILITATE ELECTRONIC COMMUNICATION

(71) Applicant: Snap Inc., Santa Monica, CA (US)

(72) Inventors: Dylan Shane Eirinberg, Venice, CA (US); Jeremy Voss, Los Angeles, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,139

(22) Filed: Oct. 4, 2023

(65) Prior Publication Data

US 2024/0040082 A1     Feb. 1, 2024

Related U.S. Application Data

(63) Continuation of application No. 17/679,441, filed on Feb. 24, 2022, now Pat. No. 11,877,093, which is a
(Continued)

(51) Int. Cl.
*H04N 7/15*     (2006.01)
*H04L 51/046*     (2022.01)
(Continued)

(52) U.S. Cl.
CPC ............ *H04N 7/15* (2013.01); *H04L 51/046* (2013.01); *H04L 51/216* (2022.05); *H04L 51/52* (2022.05)

(58) Field of Classification Search
CPC .......... H04N 7/15; H04L 51/216; H04L 51/52
See application file for complete search history.

(56) References Cited

U.S. PATENT DOCUMENTS 10,516,851 B1    12/2019    Eirinberg et al.
10,904,484 B1    1/2021    Eirinberg et al.
(Continued)

OTHER PUBLICATIONS

"U.S. Appl. No. 16/135,847, Non Final Office Action mailed Apr. 4, 2019", 9 pgs.
(Continued)

*Primary Examiner* — Amal S Zenati
(74) *Attorney, Agent, or Firm* — Schwegman Lundberg & Woessner, P.A.

(57) ABSTRACT

Aspects of the present disclosure involve a system comprising a computer-readable storage medium storing at least one program, method, and user interfaces to facilitate communication between users via multiple modes of electronic communication. The system displays a conversation view that presents messages exchanged between a first user and at least one other user in an electronic chat conversation. The conversation view includes an interactive element to enable the first user to initiate a video call with the at least one other user. Based on receiving user input corresponding to an interaction with the interactive element, the system initiates the video call with the at least one other user. The system displays an active call view to facilitate the video call with the at least one other user. The system toggles from displaying the active call view to displaying the conversation view in response to further user input.

20 Claims, 22 Drawing Sheets

Related U.S. Application Data continuation of application No. 17/117,998, filed on Dec. 10, 2020, now Pat. No. 11,290,683, which is a continuation of application No. 16/694,669, filed on Nov. 25, 2019, now Pat. No. 10,904,484, which is a continuation of application No. 16/135,847, filed on Sep. 19, 2018, now Pat. No. 10,516,851.

(51) Int. Cl.
*H04L 51/216* (2022.01)
*H04L 51/52* (2022.01)

(56) References Cited

U.S. PATENT DOCUMENTS

| | | | |
|---|---|---|---|
| 11,290,683 | B2 | 3/2022 | Eirinberg et al. |
| 11,877,093 | B2 | 1/2024 | Eirinberg et al. |
| 2004/0257433 | A1 | 12/2004 | Lia et al. |
| 2011/0273526 | A1 | 11/2011 | Mehin et al. |
| 2016/0062584 | A1 | 3/2016 | Cohen et al. |
| 2016/0173823 | A1* | 6/2016 | Duckworth ............ H04N 23/90 348/14.07 |
| 2016/0380931 | A1* | 12/2016 | Sircar .................. H04L 51/224 709/206 |
| 2017/0269820 | A1* | 9/2017 | Riley ...................... H04N 7/15 |
| 2021/0099675 | A1 | 4/2021 | Eirinberg et al. |
| 2022/0182580 | A1 | 6/2022 | Eirinberg et al. |

OTHER PUBLICATIONS

"U.S. Appl. No. 16/135,847, Response filed Aug. 5, 2019 to Non-Final Office Action mailed Apr. 4, 2019", 13 pgs.

"U.S. Appl. No. 16/694,669, Corrected Notice of Allowability mailed Dec. 2, 2020", 4 pgs.

"U.S. Appl. No. 16/694,669, Non Final Office Action mailed Jun. 25, 2020", 7 pgs.

"U.S. Appl. No. 16/694,669, Notice of Allowance mailed Sep. 18, 2020".

"U.S. Appl. No. 16/694,669, Response filed Aug. 31, 2020 to Non Final Office Action mailed Jun. 25, 2020", 9 pgs.

"U.S. Appl. No. 17/117,998, Non Final Office Action mailed Sep. 13, 2021", 6 pgs.

"U.S. Appl. No. 17/117,998, Notice of Allowance mailed Nov. 23, 2021", 6 pgs.

"U.S. Appl. No. 17/117,998, Response filed Nov. 4, 2021 to Non Final Office Action mailed Sep. 13, 2021", 8 pgs.

"U.S. Appl. No. 17/679,441, Advisory Action mailed Jul. 26, 2023", 3 pgs.

"U.S. Appl. No. 17/679,441, Final Office Action mailed Apr. 13, 2023", 9 pgs.

"U.S. Appl. No. 17/679,441, Non Final Office Action mailed Oct. 4, 2022", 9 pgs.

"U.S. Appl. No. 17/679,441, Notice of Allowance mailed Aug. 21, 2023", 6 pgs.

"U.S. Appl. No. 17/679,441, Response filed Jan. 3, 2023 to Non Final Office Action mailed Oct. 4, 2022", 8 pgs.

"U.S. Appl. No. 17/679,441, Response filed Jul. 11, 2023 to Final Office Action mailed Apr. 13, 2023", 9 pgs.

"Canadian Application Serial No. 16/135,847, Notice of Allowance mailed Aug. 19, 2019", 5 pgs.

U.S. Appl. No. 16/135,847 U.S. Pat. No. 10,516,851, filed Sep. 19, 2018, User Interfaces to Faceitate Multiple Modes of Electronic Communication.

U.S. Appl. No. 16/694,669 U.S. Pat. No. 10,904,484, filed Nov. 25, 2019, User Interfaces to Faceitate Multiple Modes of Electronic Communication.

U.S. Appl. No. 17/117,998 U.S. Pat. No. 11,290,683, filed Dec. 10, 2020, User Interfaces to Faceitate Multiple Modes of Electronic Communication.

U.S. Appl. No. 17/679,441, filed Feb. 24, 2022, User Interfaces to Facilitate Electronic Communication.

\* cited by examiner

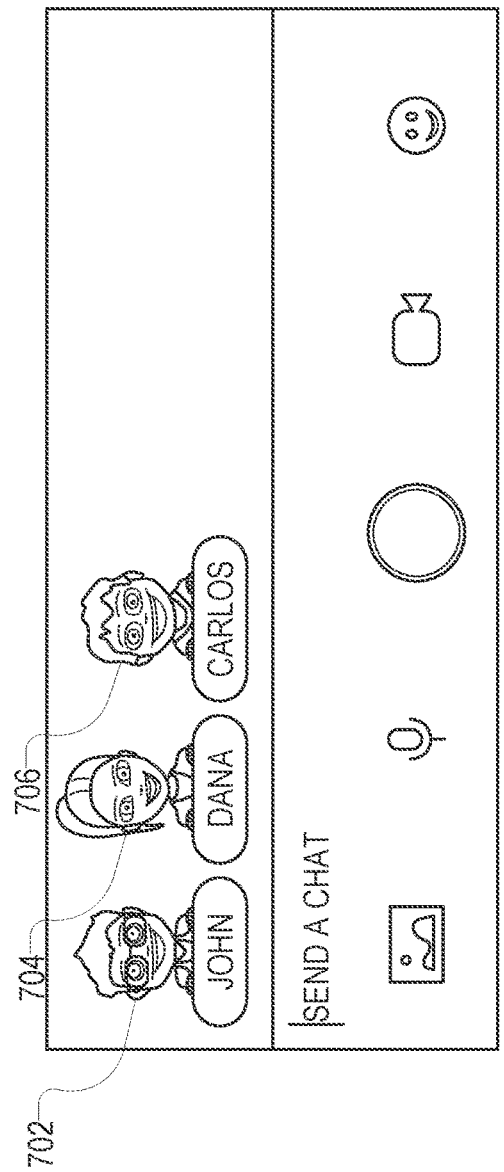
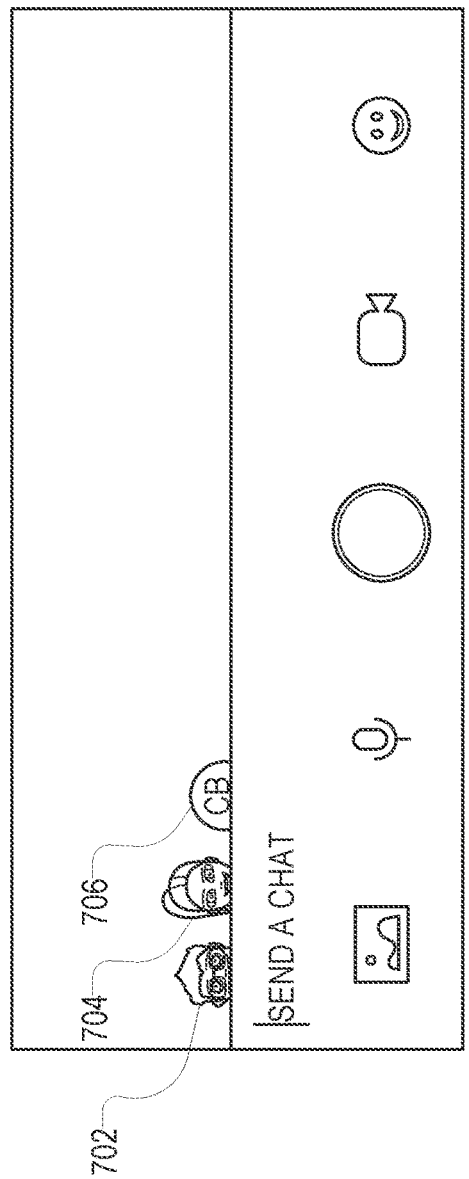

FIG. 8A

- BRUNCH CLUB — WILL IS CALLING...
- MARK WRIGLEY ▷ OPENED JUST NOW
- JENNIFER WEBER ▢ VIEW SNAP 12M
- MARY RODRIGUE12 ▢ VIEW SNAP 14M
- GOLF BUDDIES ▢ RECEIVED FROM MARK 2H
- MARY RODRIGUE12 ▷ OPENED 6H
- MARK WILLIAMS ▢ RECEIVED 23H
- SAMANTHA GIBBONS ↪ ADDED TO STORY 1D
- NICOLE ADELSON ▷ OPENED 2D

FIG. 8B

- BRUNCH CLUB — CALL ACTIVE-DYLAN AND WILL
- MARK WRIGLEY ▷ OPENED JUST NOW
- JENNIFER WEBER ▢ VIEW SNAP 12M
- MARY RODRIGUE12 ▢ VIEW SNAP 14M
- GOLF BUDDIES ▢ RECEIVED FROM MARK 2H
- MARY RODRIGUE12 ▷ OPENED 6H
- MARK WILLIAMS ▢ RECEIVED 23H
- SAMANTHA GIBBONS ↪ ADDED TO STORY 1D
- NICOLE ADELSON ▷ OPENED 2D

FIG. 8C

- BRUNCH CLUB — CALL ENDED
- MARK WRIGLEY ▲
- JENNIFER WEBER ▢
- MARY RODRIGUE12 ▢
- GOLF BUDDIES ▢ RECEIVED FROM MARK 2H
- MARY RODRIGUE12 ▷ OPENED 6H
- MARK WILLIAMS ▢ RECEIVED 23H
- ↪ ADDED TO STORY 1D
- NICOLE ADELSON ▷ OPENED 2D

USER INTERFACES TO FACILITATE ELECTRONIC COMMUNICATION

CROSS-REFERENCE TO RELATED APPLICATION

This application is a continuation of U.S. patent application Ser. No. 17/679,441, filed Feb. 24, 2022, which application is a continuation of U.S. patent application Ser. No. 17/117,998, filed Dec. 10, 2020, now issued as U.S. Pat. No. 11,290,683, which is a continuation of U.S. patent application Ser. No. 16/694,669, filed Nov. 25, 2019, now issued as U.S. patent Ser. No. 10/904,484, which is a continuation of U.S. patent application Ser. No. 16/135,847, filed Sep. 19, 2018, now issued as U.S. Pat. No. 10,516,851, each of which are incorporated by reference herein in their entireties.

TECHNICAL FIELD

The present disclosure generally relates to facilitating electronic communication between users. In particular, example embodiments of the present disclosure address systems, methods, and user interfaces to facilitate communication between users via multiple modes of electronic communication.

BACKGROUND

Social media applications, such as online chat applications, allow users to exchange messages with one another. These applications often provide a graphical interface from which a user can send and receive text-based messages exchanged as part of an electronic conversation with other users. Often these applications run on mobile and other electronic devices that are capable of facilitating other modes of electronic communication such as voice or video calling. However, the graphical interfaces of these applications typically do not allow users to seamlessly transition from one mode of communication to another.

For many of these types of applications, a user participating in an electronic chat conversation who wishes to transition a conversation from a text-based electronic conversation to another mode of communication (e.g., a video or voice call) typically needs to exit the application, and navigate to another application that facilitates the other mode of communication such as a video calling application. Once the user has opened the video calling application, the user must initiate a video call with each participant of the electronic conversation, who may each have a different name (e.g., a username or account name) associated with the video call from the name associated with the social media application. As a result, some participants of the chat may be left off of the video call, and other participants may continue to exchange text-based messages that may go unseen by those participating in the video call.

Further, in mobile applications, interfaces provided by typical video call applications are often not suitable to facilitate video calls between more than two users given the limited display size of most mobile electronic devices. What's more, if a user wishes to return to the text-based electronic conversation after switching over to a video call, the user must exit the video call while others may continue to participate, and the user must then navigate back to the social media application to find the chat conversation, which may require further navigation between various screens and windows presented by the social media application.

BRIEF DESCRIPTION OF THE DRAWINGS

To easily identify the discussion of any particular element or act, the most significant digit or digits in a reference number refer to the figure number in which that element or act is first introduced.

FIGS. 7A and 7B are interface diagrams illustrating additional aspects of GUIs provided by the messaging system, according to example embodiments.

FIGS. 8A-8C are interface diagrams illustrating additional aspects of GUIs provided by the messaging system, according to example embodiments.

DETAILED DESCRIPTION

Description

Figure 1:
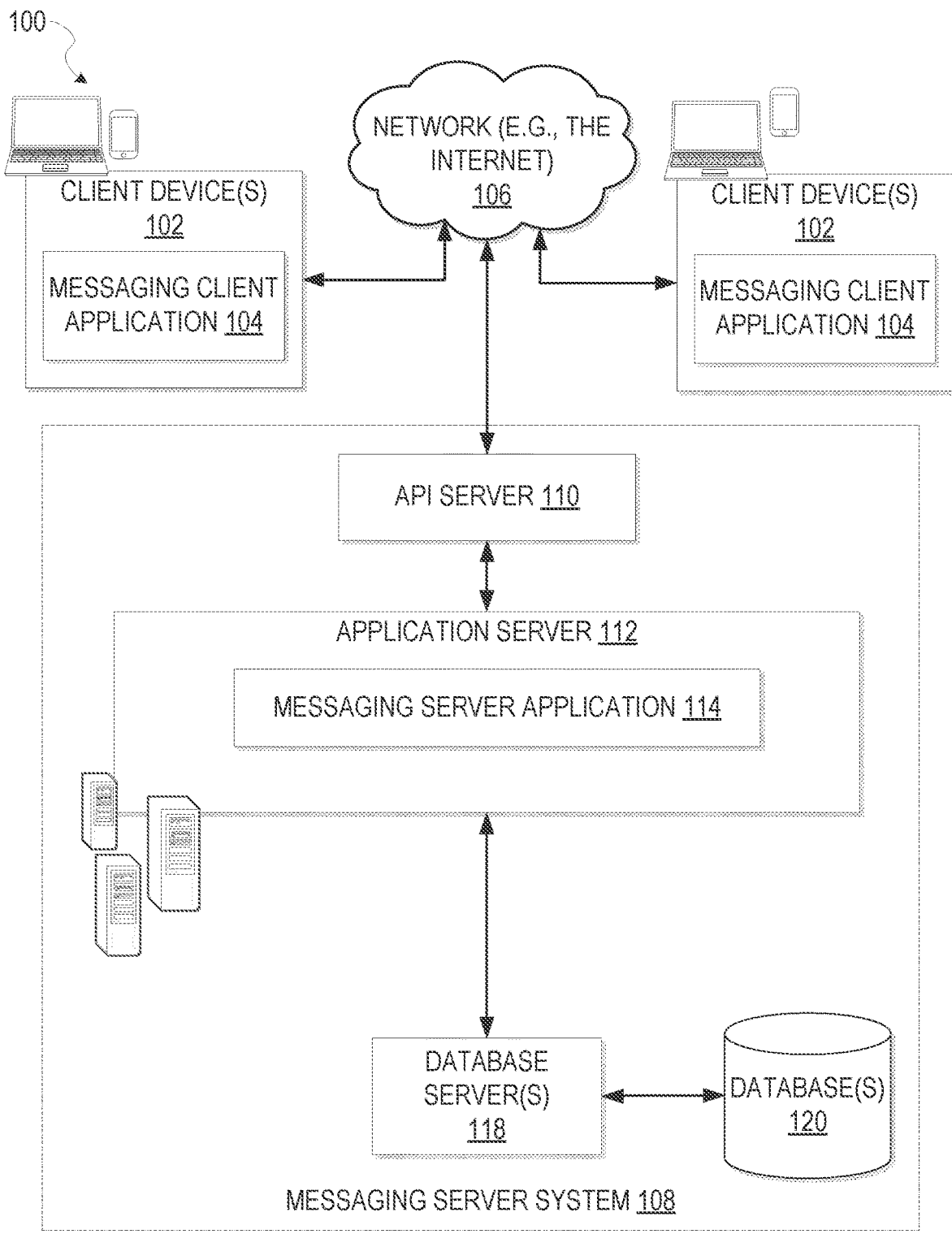
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products for facilitating communication between users via multiple modes of electronic communication. To address the shortcomings of conventional social media applications described above, a messaging system is configured to facilitate communication via text, voice, and video. To facilitate communication via these multiple modes of communication, the messaging system provides an interactive messaging interface that includes multiple views, each of which enables communication between users via one or more modes of communication. As used herein, a "view" is a component of a user interface that includes an output representation of information in a particular format. Each of the multiple views of the interactive messaging interface may present different information or multiple views may present the same or similar information in different formats. Further, each of the multiple views may provide or enable different functionality with respect to the messaging system.

As an example, the messaging interface of the messaging system includes a conversation view that allows users to author, send, and view messages exchanged as part of an electronic chat conversation between users. The conversation view includes graphical representations of each participating user (e.g., an avatar). The conversation view also enables users to initiate voice and video calls with users participating in the chart conversation.

An active call view of the messaging interface facilitates real-time communication between users via a video call. The active call view presents streaming video feeds of each user who has accepted the video call. The manner in which the streaming video feeds are displayed within the active call view (e.g., size and configuration) depends on a number of users participating in the video call and properties of a device on which the active call view is presented. In this way, the messaging system may provide an improvement over conventional social media applications and their user interfaces by facilitating video calls between more than two users despite limited screen sizes of mobile devices on which such applications are typically run.

The messaging system enables users to toggle between the active call view and the conversation view while a video call is active. During an active video call, the graphical representations of users who have accepted the video call are replaced by streaming video feeds of the users in the conversation view. By allowing users to toggle between the active call view and the conversation view, the messaging system improves upon conventional social media applications and their user interfaces by providing an interactive interface that allows users to quickly and easily switch between modes of communication without needing to switch between multiple applications or devices. As an additional improvement to conventional social media applications, the user interface of the messaging system also allows users to simultaneously engage in multiple modes of communication with other users without needing to use multiple applications or devices.

DRAWINGS

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114, for possible access by another messaging client application 104; the setting of a collection of media data (e.g., story); the retrieval of such collections; the retrieval of a list of friends of a user of a client device 102; the retrieval of messages and content; the adding of friends to and deletion of friends from a social graph; the location of friends within a social graph; and opening an application event (e.g., relating to the messaging client application 104).

The application server 112 hosts a messaging server application 114 that implements a number of message processing technologies and functions. Other processor—and memory-intensive processing of data may also be performed server-side by the messaging server application 114, in view of the hardware requirements for such processing.

Figure 2:
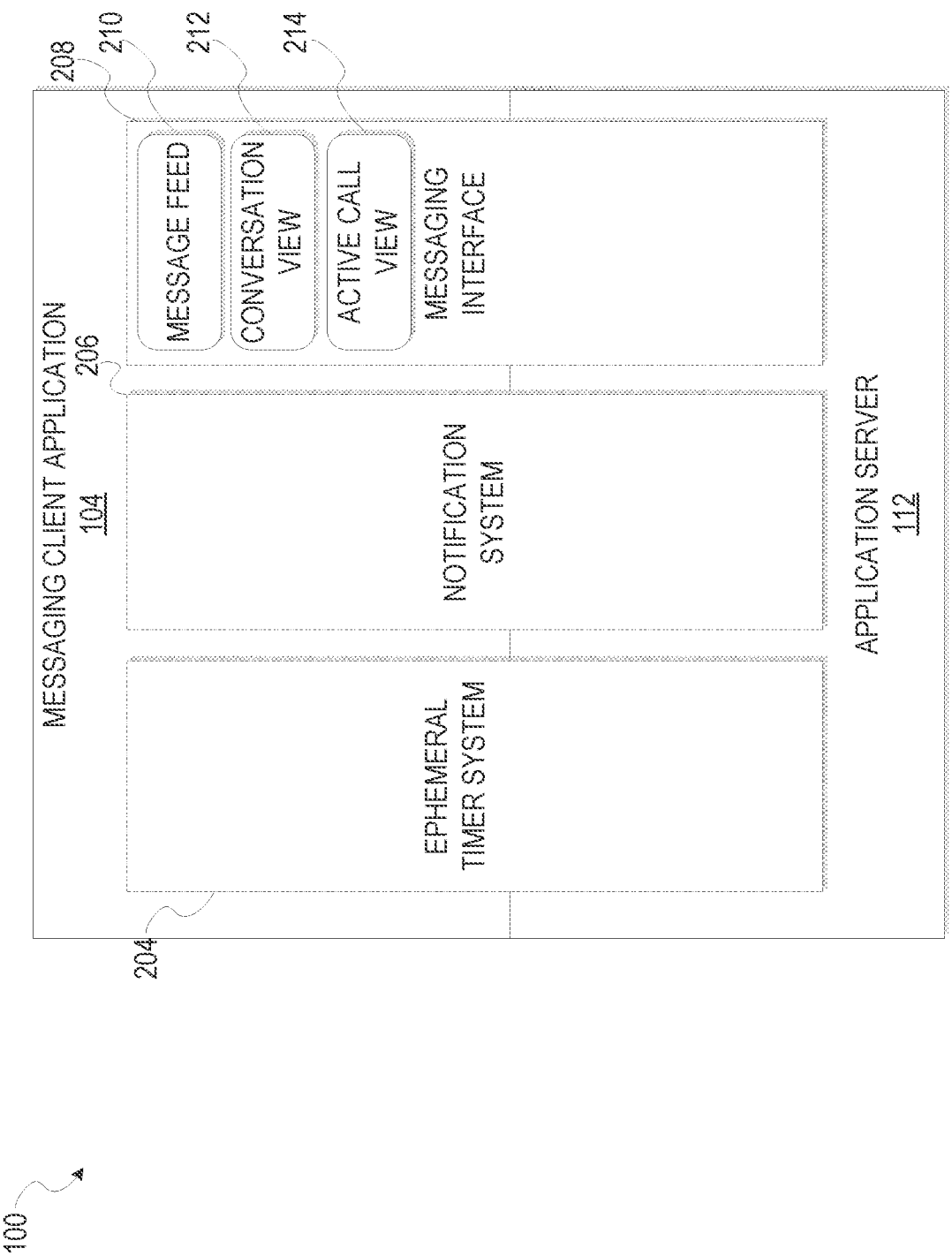
FIG. 2 is a block diagram illustrating further details regarding the messaging system, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 204 and a notification system 206. The messaging system 100 also includes a messaging interface 208 that includes a message feed 210, a conversation view 212, and an active call view 214.

The message feed 210 presents indicators of chat conversations in which a user is a participant. Each chat conversation indicator may be selected to access a conversation view 212 that enables a user to author, send, and view messages of the chat conversation. Each message presented in the conversation view 212 may be presented with a read indicator that indicates whether the message has been read by the receiving user. In some instances, upon a message being read by the receiving user, the read indicator may be replaced with an indicator of remaining time available for accessing the message. The active call view 214 facilitates real-time communication between users via streaming video feeds. As such, the active call view 214 includes a display of streaming video feeds of users participating in a video call. Further details regarding the message feed 210, conversation view 212, and active call view 214 are discussed below.

The ephemeral timer system 204 is responsible for enforcing message durations for messages exchanged within the context of the messaging system 100. To this end, the ephemeral timer system 204 incorporates a number of timers that, based on retention duration attributes associated with a chat conversation, selectively display and enable access to messages and associated content via the messaging client application 104. Further details regarding the operation of the ephemeral timer system 204 are provided below.

The notification system 206 is responsible for providing notifications related to the exchange of messages within the context of the messaging system 100. The notification system 206 may, for example, provide notifications of newly initiated chat conversations and newly received messages. The notification system 206 may also provide notifications of incoming voice or video calls. In an example, the notification system 206 may cause display of a notification within the message feed 210 of an incoming call (e.g., voice or video) associated with a chat conversation.

Figure 3:
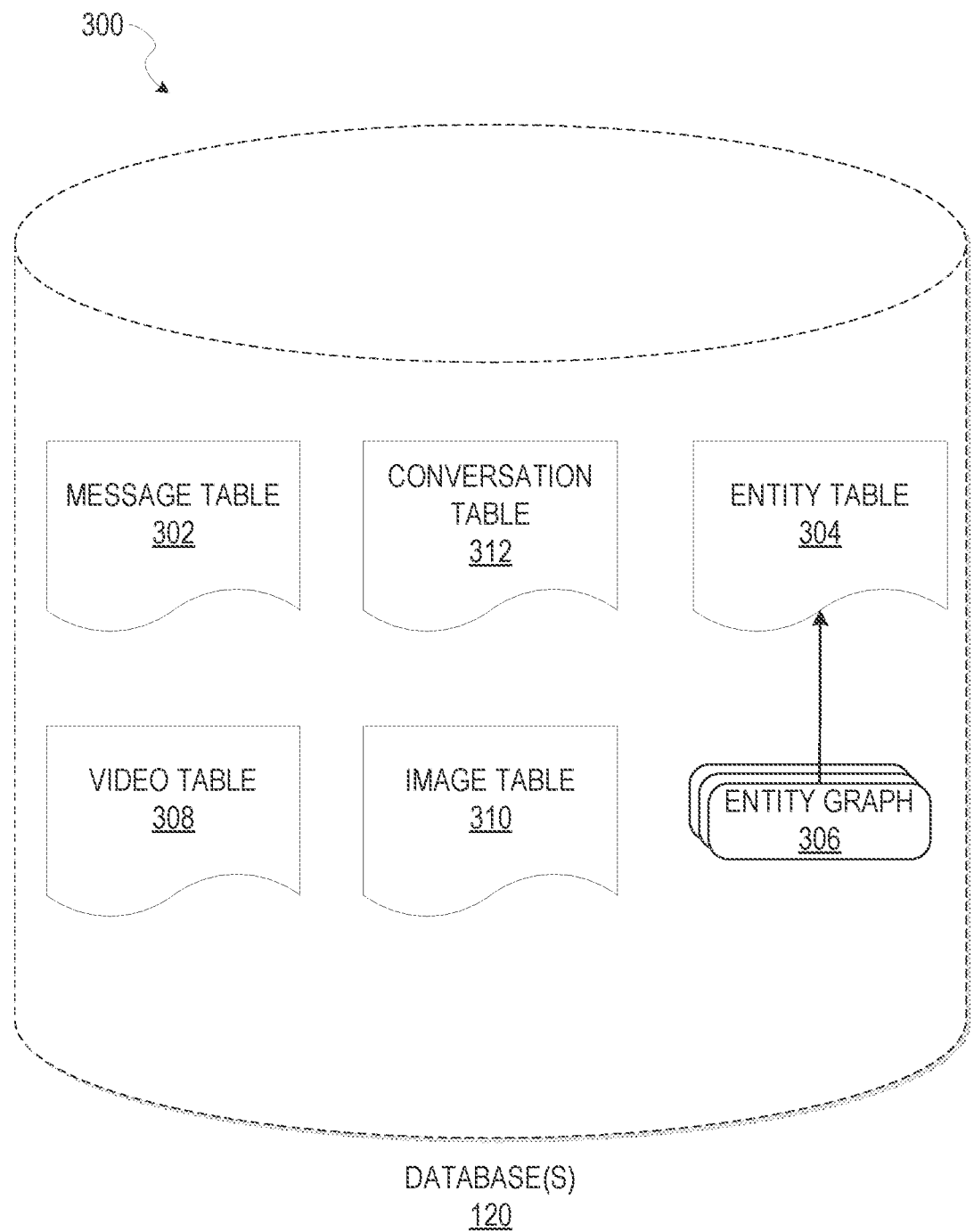
FIG. 3 is a schematic diagram illustrating data which may be stored in a database of a messaging server system, according to example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 302. An entity table 304 stores entity data, including an entity graph 306. Entities for which records are maintained within the entity table 304 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 306 furthermore stores information regarding relationships and associations between entities. Such relationships may be social, professional (e.g., work at a common corporation or organization), interested-based, or activity-based, merely for example.

A video table 308 stores video data associated with messages for which records are maintained within the message table 302. Similarly, an image table 310 stores image data associated with messages for which message data is stored in the message table 302.

A conversation table 312 stores data regarding chat conversations and associated content (e.g., image, video, or audio data). A record for each chat conversation may be maintained in the conversation table 312. Each record may include a unique identifier for the chat conversation, a retention duration attribute, identifiers of entities that are participants in the chat conversation (or pointers to the identifiers in the entity table 304), and message data (or pointers to corresponding message data in the message table 302).

Figure 4:
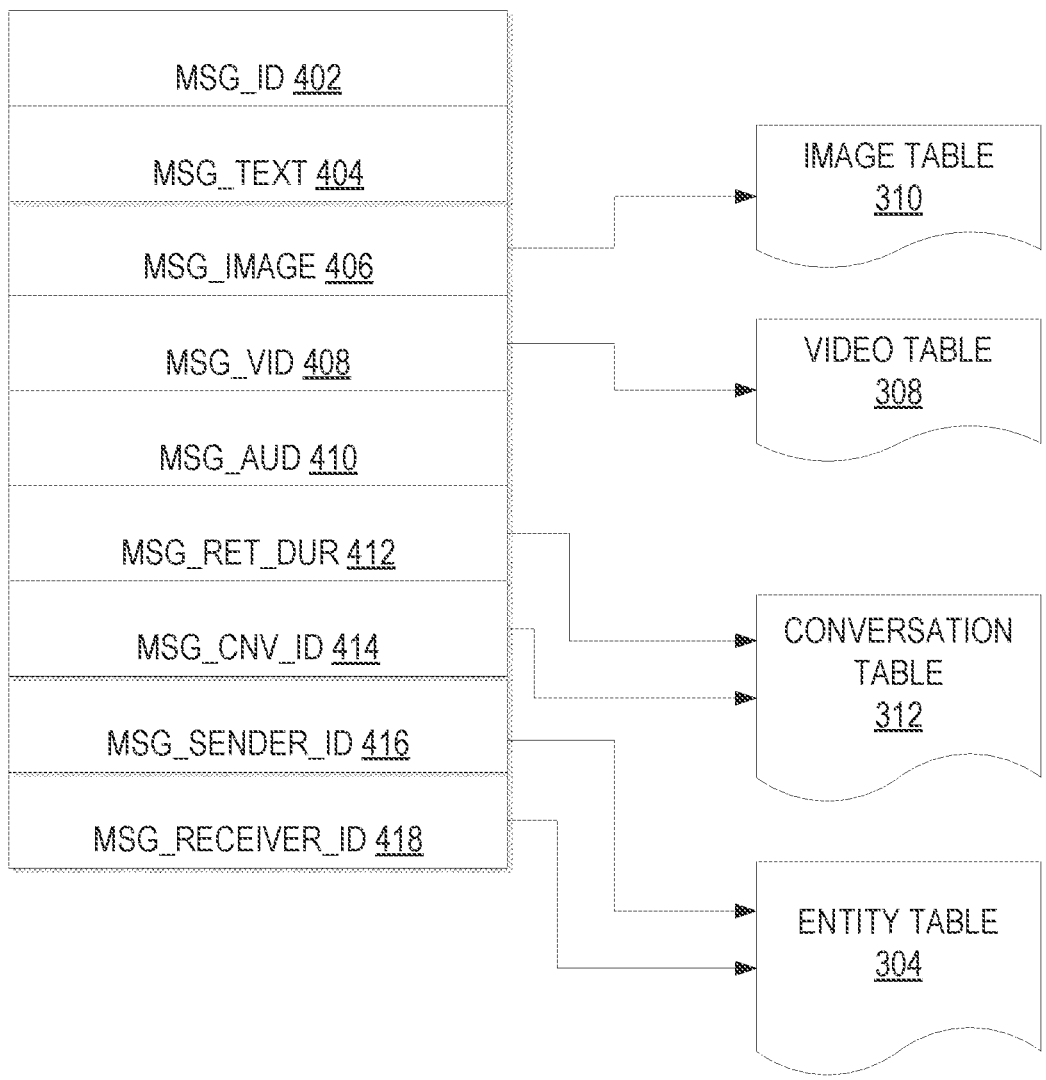
FIG. 4 is a schematic diagram illustrating a structure of a message generated by a messaging client application for communication, according to example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 302 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of the client device 102 or retrieved from memory of the client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message duration attribute 412: an attribute value indicating, in seconds, the amount of time for which content of the message 400 (e.g., the message image payload 406, message video payload 408, and message audio payload 410) is to be made accessible to a user via the messaging client application 104 upon accessing the message 400.
- A conversation identifier 414: an identifier indicative of the chat conversation to which the message belongs.
- A message sender identifier 416: an identifier (e.g., a messaging system identifier, email address, or device identifier) indicative of a user of the client device 102 on which the message 400 was generated and from which the message 400 was sent.
- A message receiver identifier 418: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within an image table 310. Similarly, values within the message video payload 408 may point to data stored within a video table 308, values stored within the conversation identifier 414 may point to data stored within the conversation table 312, and values stored within the message sender identifier 416 and the message receiver identifier 418 may point to user records stored within an entity table 304.

Figure 5:
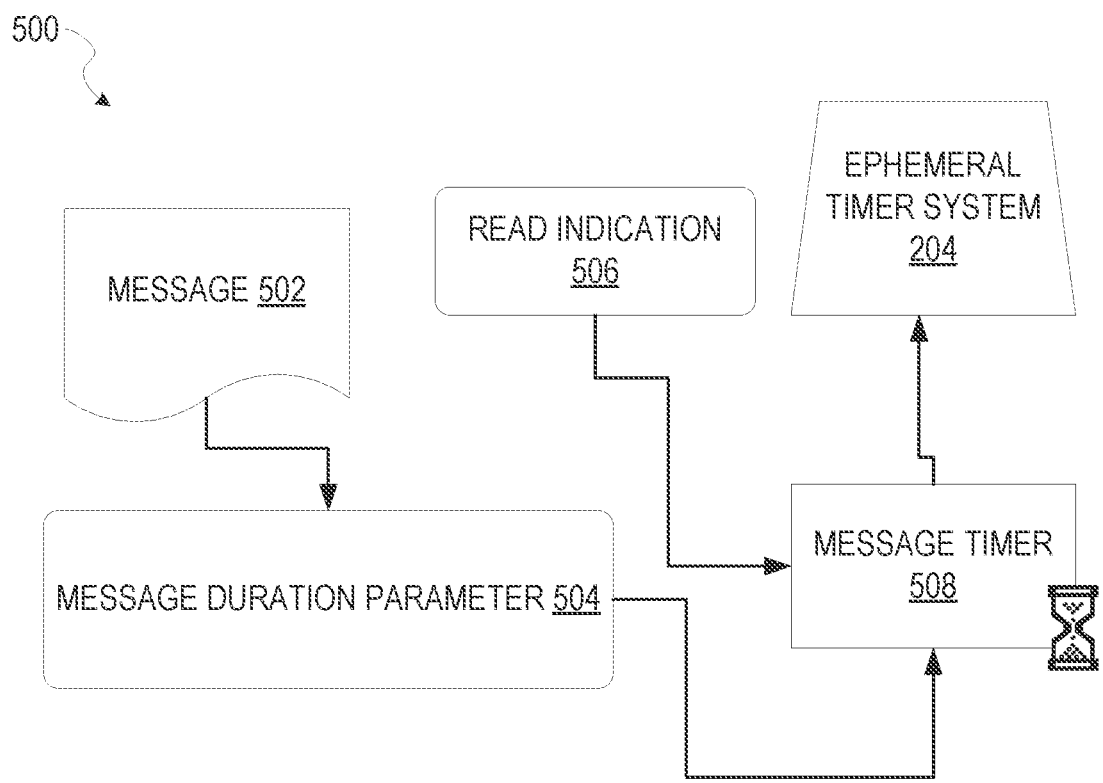
FIG. 5 is a schematic diagram illustrating an example access-limiting process, in terms of which access to content (e.g., an ephemeral message, and associated multimedia payload of data) may be time-limited (e.g., made ephemeral), according to example embodiments.

FIG. 5 is a schematic diagram illustrating an access-limiting process 500, in terms of which access to content (e.g., a message 502, and associated multimedia payload of data) may be time-limited (e.g., made ephemeral).

A message 502 is shown to be associated with a message duration parameter 504, the value of which determines an amount of time that the message 502 will be made accessible by the messaging client application 104 upon being read by a receiving user. In one example, the message 502 is accessible for 24 hours upon being read by the receiving user.

The message duration parameter 504 (e.g., the value of the message duration attribute 412) and a read indication 506 are shown to be inputs to a message timer 508, which is responsible for determining the amount of time that the message 502 is made accessible to the participants of the chat conversation identified by the message sender identifier 416 and the message receiver identifier 418. In particular, the message 502 will only be accessible to the relevant users for a time period determined by the value of the message duration parameter 504 after the message 502 has been read by the relevant receiving user. The time period may be based on a message receipt time. The read indication 506 may be triggered by the receiving user accessing the chat conversation in which the message 502 was received, by the receiving user confirming that the message 502 has been read, when the message 502 has been displayed on a screen for a threshold amount of time, or via any other such system for determining that the message 502 has been read.

The message timer 508 is shown to provide output to a more generalized ephemeral timer system 204, which is responsible for the overall timing of display of content (e.g., the message 502) to a receiving user. When the ephemeral timer system 204 determines that the retention duration specified by the message duration parameter 504 for a particular message 502 has expired after receiving the read indication 506, the ephemeral timer system 204 causes the message 502 to be erased from memory. Further, the ephemeral timer system 204 causes the messaging client application 104 to no longer display an indicium (e.g., an icon or textual identification) associated with the message 502.

Figure 6A:
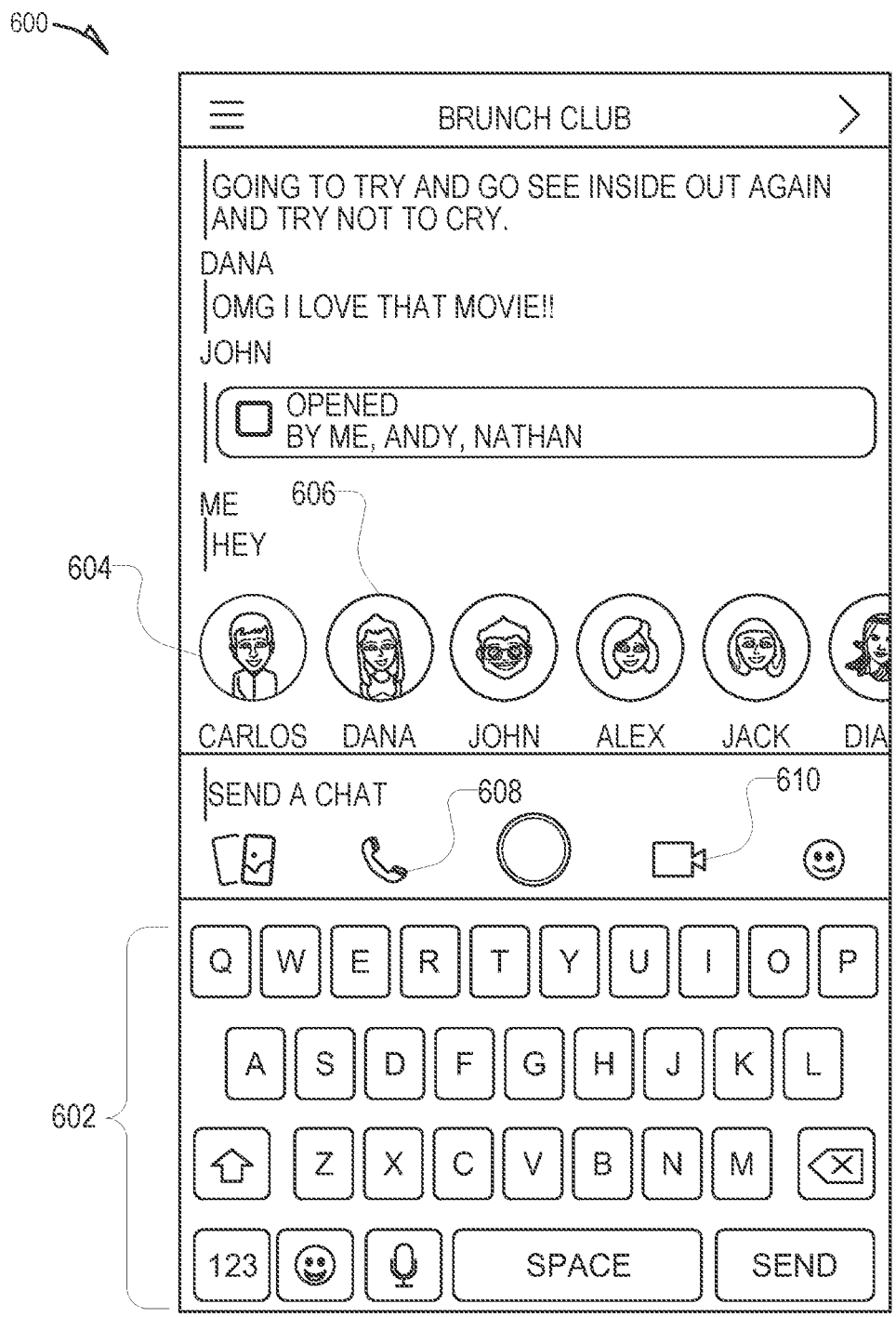
FIGS. 6A-6I are interface diagrams illustrating aspects of graphical user interfaces (GUIs) provided by the messaging system, according to example embodiments.

FIGS. 6A-6I are interface diagrams illustrating aspects of GUIs provided by the messaging system 100, according to example embodiments. In the context of FIGS. 6A-6I, a group of users (e.g., "Carlos," "Dana," "John," "Alex," and "Jack") are engaged in an electronic conversation. FIG. 6A illustrates a conversation view 600 as displayed on the client device 102 of a first user of the group of users (identified as "Me" within the conversation view 600). The conversation view 600 is an example of the conversation view 212.

The conversation view 600 presents text-based messages exchanged between the group of users as part of the electronic conversation. The first user may submit text-based messages to the electronic conversation using a keyboard 602. Like messages submitted by the other users participating in the chat, messages submitted by the first user are displayed within the conversation view 600 displayed on the client device 102 of the first user as well as a conversation view displayed on the devices of the other participating users.

As shown, the conversation view 600 displays a graphical representation (e.g., an avatar or a Bitmoji) of each user participating in the chat conversation. The graphical representation of a user is presented in conjunction with an identifier of the user. As an example, a bubble element 604 includes a graphical representation of a second user, Carlos, and a bubble element 606 includes a graphical representation of a third user, Dana.

The conversation view 600 also includes an input bar that includes multiple interactive elements (e.g., buttons) that allow the first user to switch from communicating with the group of users using the text-based mode of communication to another mode of communication. For example, an interactive element 608 enables the first user to trigger the messaging system 100 to initiate a voice call with the group of users. An interactive element 610 enables the first user to trigger the messaging system 100 to initiate a video call with the group of users.

Figure 6B:
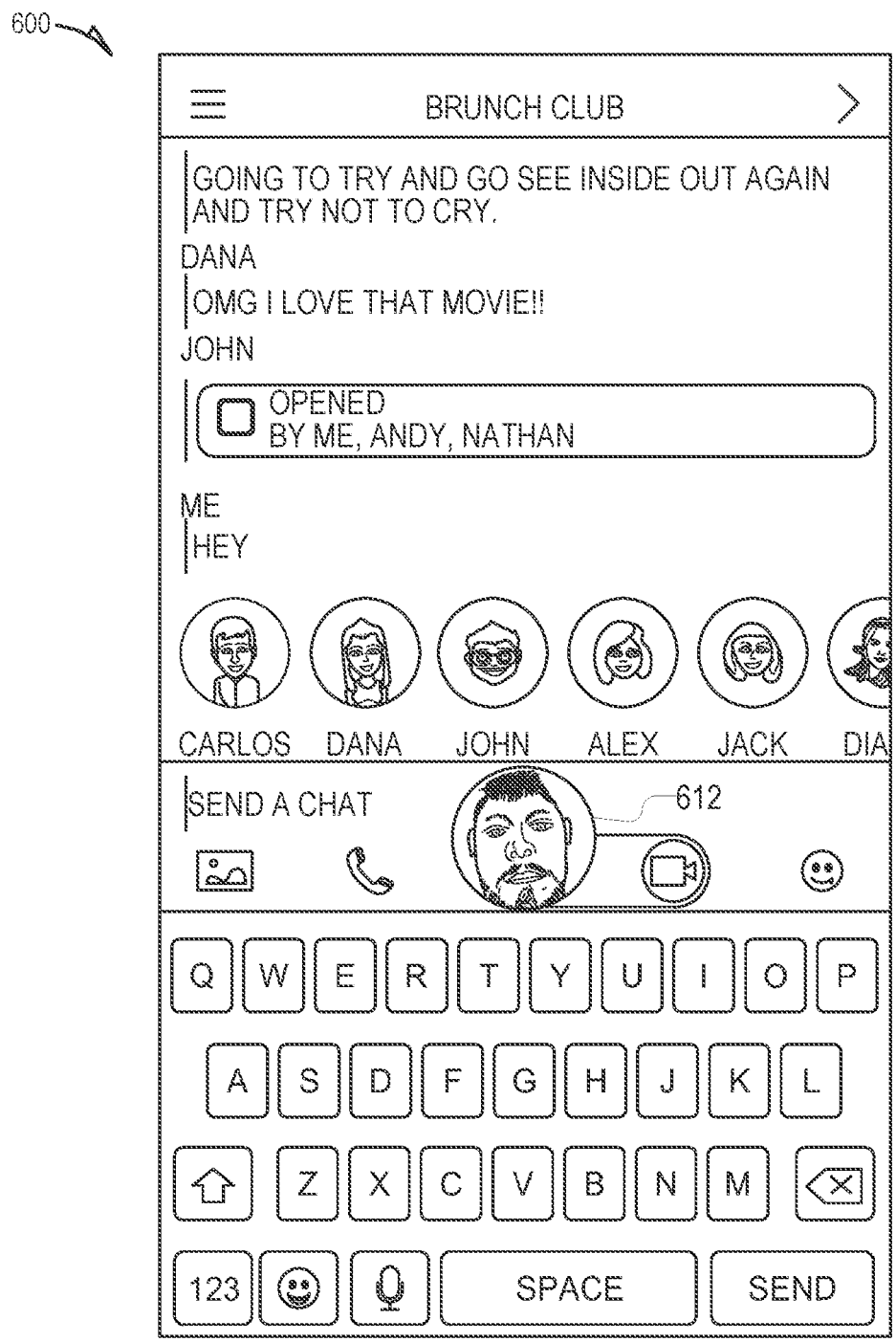

In response to receiving user input corresponding to a selection of the interactive element 610, the messaging system 100 initiates a video call with the group of users participating in the electronic conversation. As shown in FIG. 6B, the initiating of the video call includes displaying a streaming video feed of the first user within an element 612 included in the input bar. By displaying the streaming video feed of the first user within the conversation view 600 of the first user, the messaging system 100 notifies the first user of an outgoing video call. The streaming video feed of the first user corresponds to output of a camera that is embedded in or otherwise in communication with the client device 102 of the first user. Accordingly, in displaying the streaming video feed within the element 612, the messaging system 100 may activate a camera of the client device 102, and access image data produced thereby. In other embodiments, the conversation view 600 may also provide a textual notification of the outgoing video call in addition to displaying the streaming video feed of the first user within the element 612.

Figure 6C:

The messaging system 100 may also enable the first user to augment their streaming video feed with one or more visual effects. For example, upon receiving a selection of the element 612, the messaging system 100 updates the conversation view 600 by enlarging the display of the streaming video feed of the first user and providing visual effects for selection by the first user, as shown in FIG. 6C. As shown, in FIG. 6C, a set of visual effects 614 are displayed within the conversation view 600 in conjunction with an enlarged streaming video feed of the first user, and the streaming video feed of the first user has been augmented with a visual effect selected by the first user.

As will be discussed in further detail below, the initiating of the video call also includes providing a notification to each of the other users in the group of an incoming video call that allows the users to accept and join the video call. A notification of an incoming call may be transmitted to and display on respective client devices 102 of each of the group of users.

Figure 6D:
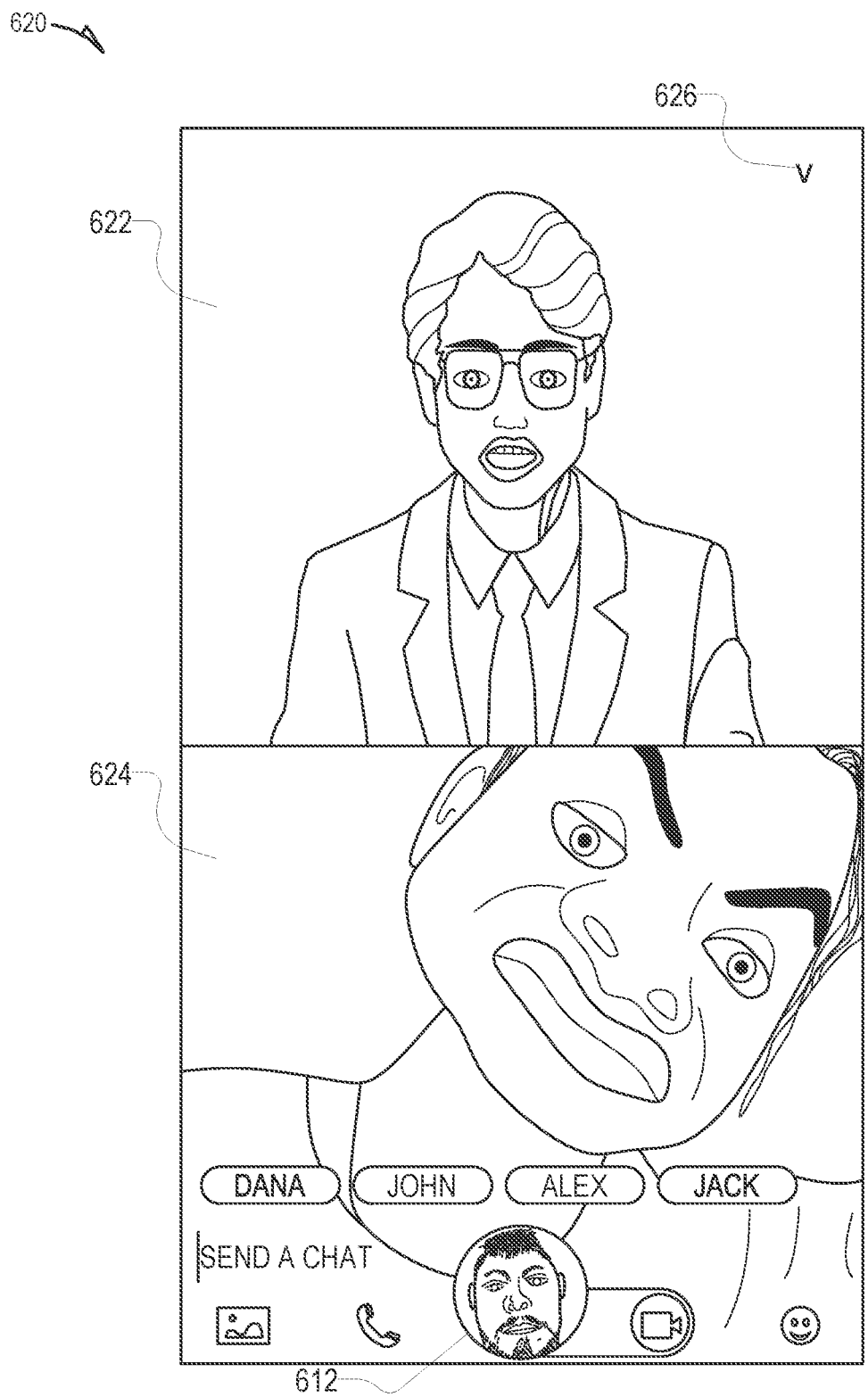

As shown in FIG. 6D, in response to detecting an acceptance of the video call by at least one other user, the messaging system 100 causes display of an active call view 620 on the client device 102 of the first user. The active call view 620 is an example of the active call view 214.

The active call view 620 comprises a window 622 comprising a streaming video feed of the second user, Carlos, and a window 624 comprising a streaming video feed of the third user, Dana. In this example, the streaming video feeds of the second and third users are displayed within the active call view 620 based on detecting an acceptance of the video call by the second and third users. The active call view 620 also includes the streaming video feed of the first user presented within the element 612.

Figure 6E:
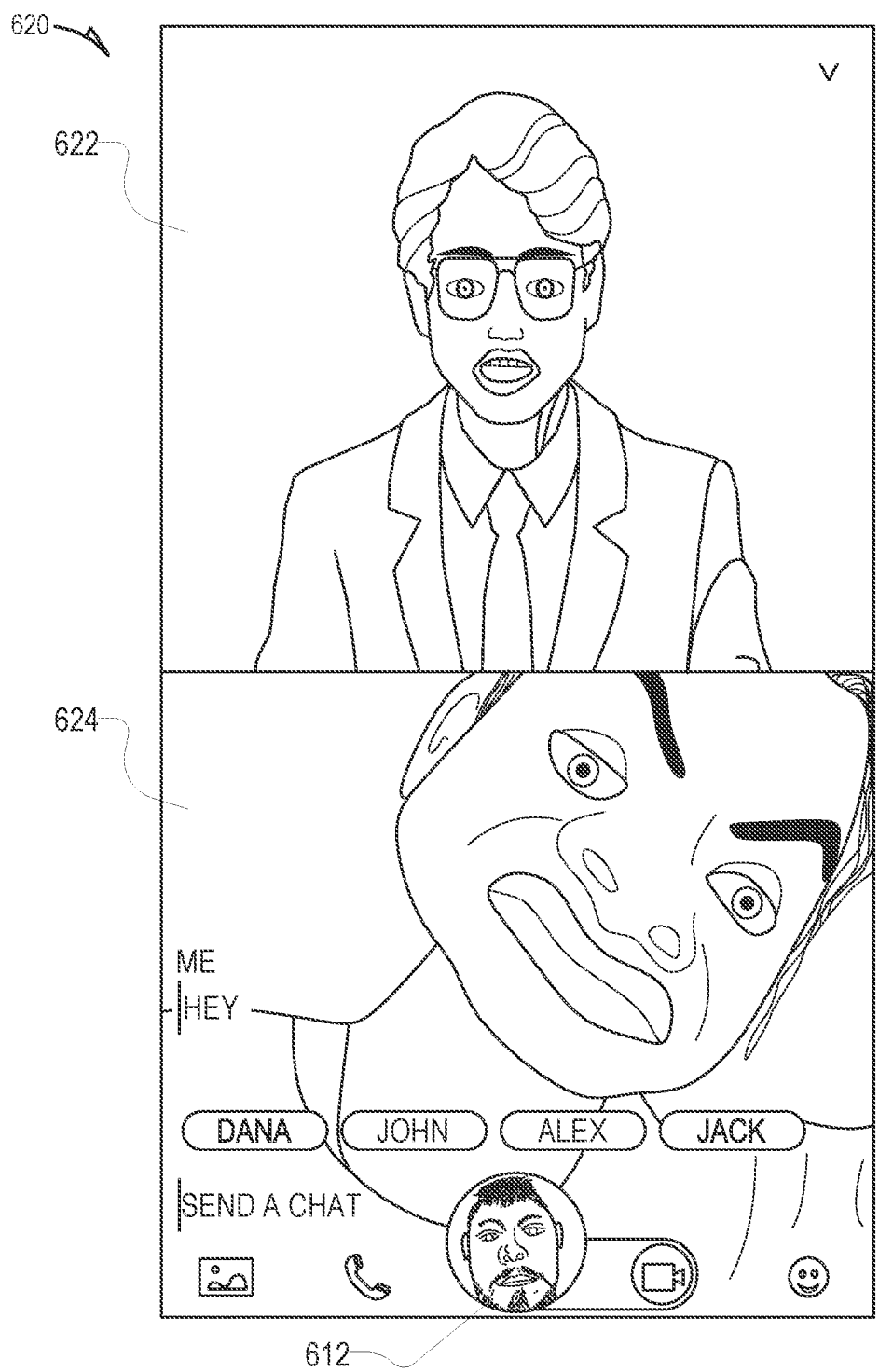

Users may continue to exchange text-based messages while the video call is active. For example, as shown in FIG. 6E, the message "Hey" submitted by the first user is displayed overlaid upon the streaming video feeds of the second and third users.

While the video call is active, the first user may also toggle the display from the active call view 620 back to the conversation view 600. For example, as shown in FIG. 6D, the active call view 620 may include an interactive element 626 (e.g., a drop-down caret) that allows the first user to access the conversation view 600 from the active call view 620. In other embodiments, the first user may provide some other type of input such as a touch screen gesture (e.g., a swipe or a double tap) to access the conversation view 600 from the active call view 620.

Figure 6F:
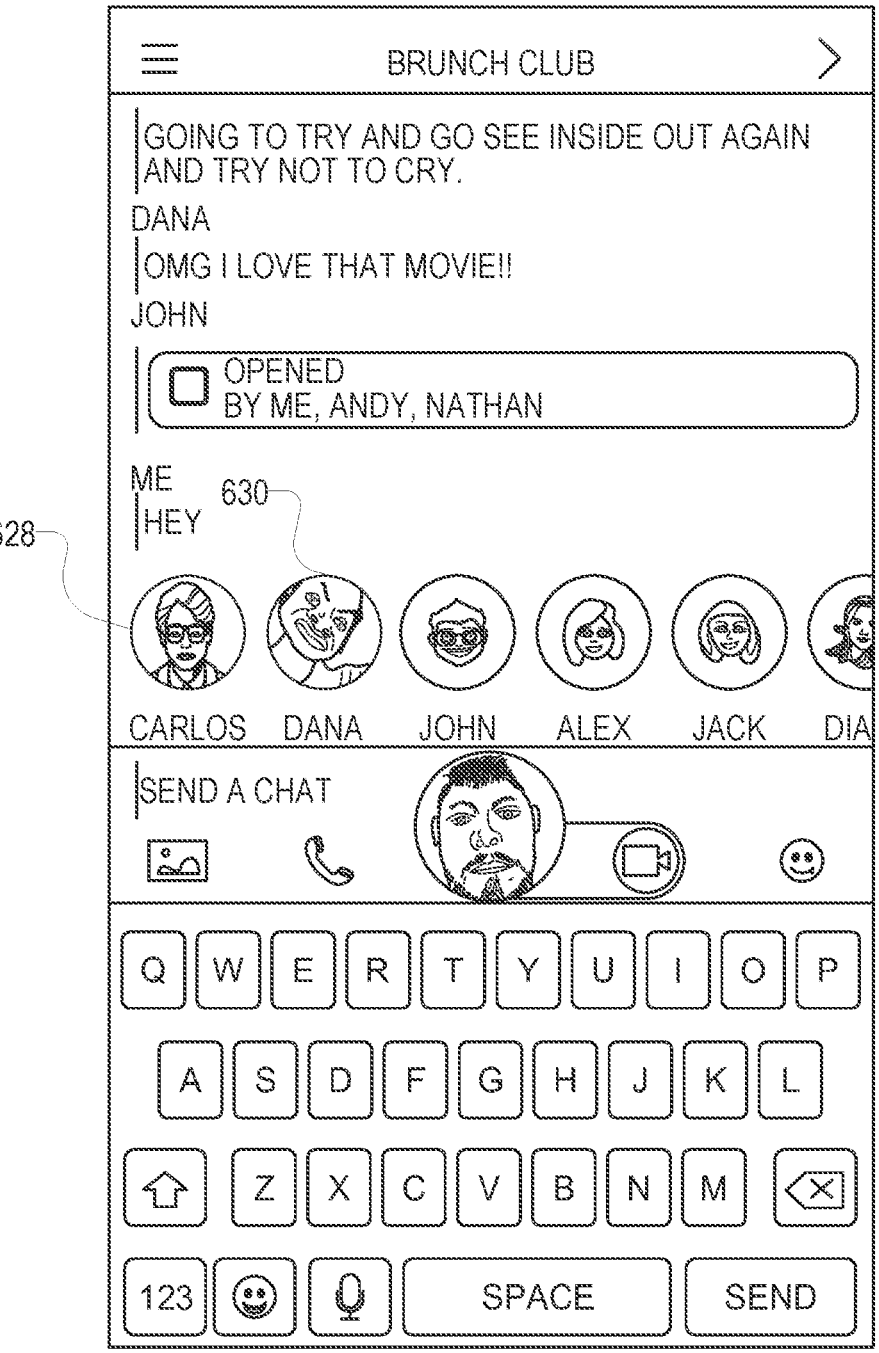

FIG. 6F illustrates a display of the conversation view 600 while the video call is active. As mentioned above, the messaging system 100 may cause the conversation view 600 to be displayed based on user input (e.g., selection of the interactive element 626 or touch screen gesture). As shown, the conversation view 600 again presents the text-based messages exchanged between the group of users, but the graphical representations of the second and third users are replaced with the streaming video feeds of the second and third users, respectively, based on the second and third users having joined the video call that is in an active state. More specifically, the bubble element 604 that included the graphical representation of the second user has been replaced with a bubble element 628 that includes the streaming video feed of the second user, and the bubble element 606 that included the graphical representation of the third user has been replaced with a bubble element 630 that includes the streaming video feed of the third user. While the call is in an active state, the conversation view 600 also presents the streaming video feed of the first user in the element 612.

Figure 6G:

While the call is in the active state, other users may accept and join the video call. When a user joins the video call while the conversation view 600 is displayed, the messaging system 100 updates the conversation view 600 by replacing a graphical representation of the joining user with the streaming video feed of the user. For example, FIG. 6G illustrates streaming video feeds of a fourth user, Alex, and fifth user, John, within the conversation view 600 in place of graphical representations of the fourth and fifth users.

Figure 6H:
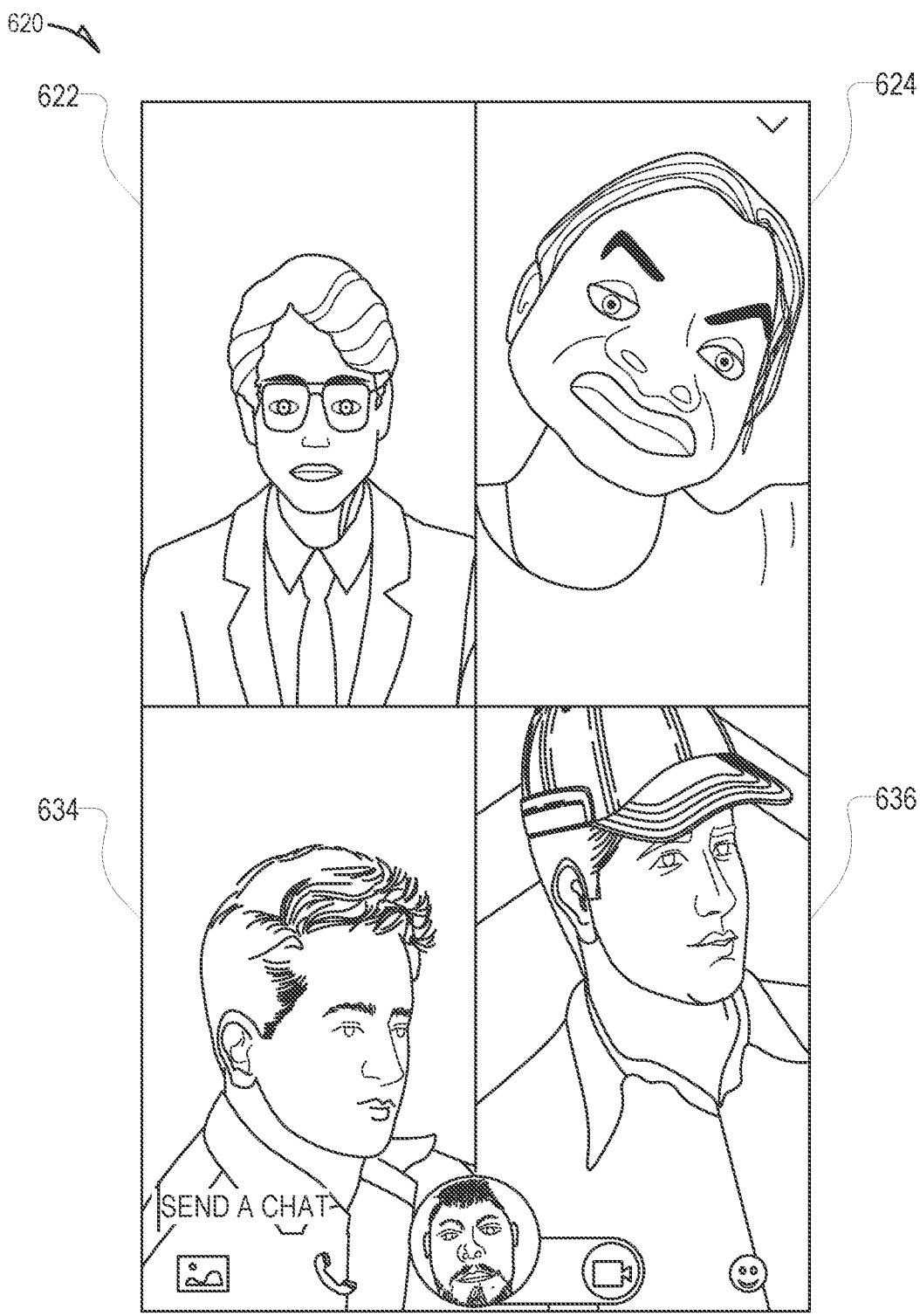

While the video call is still active, the first user may again access the active call view 620 through interaction with the conversation view 600. For example, upon receiving user input indicative of a selection of an interactive element 632, the messaging system 100 causes display of the active call view 620, as shown in FIG. 6H. As shown in FIG. 6H, the active call view 620 has been updated to include streaming video feeds of the fourth and fifth users. In updating the active call view 620, the messaging system 100 reduces the size of the windows 622 and 624 to allow adequate room to display a window 634 that includes the streaming video feed of the fourth user and a window 636 that includes the streaming video feed of the fifth user.

Figure 6I:
Figure 9:
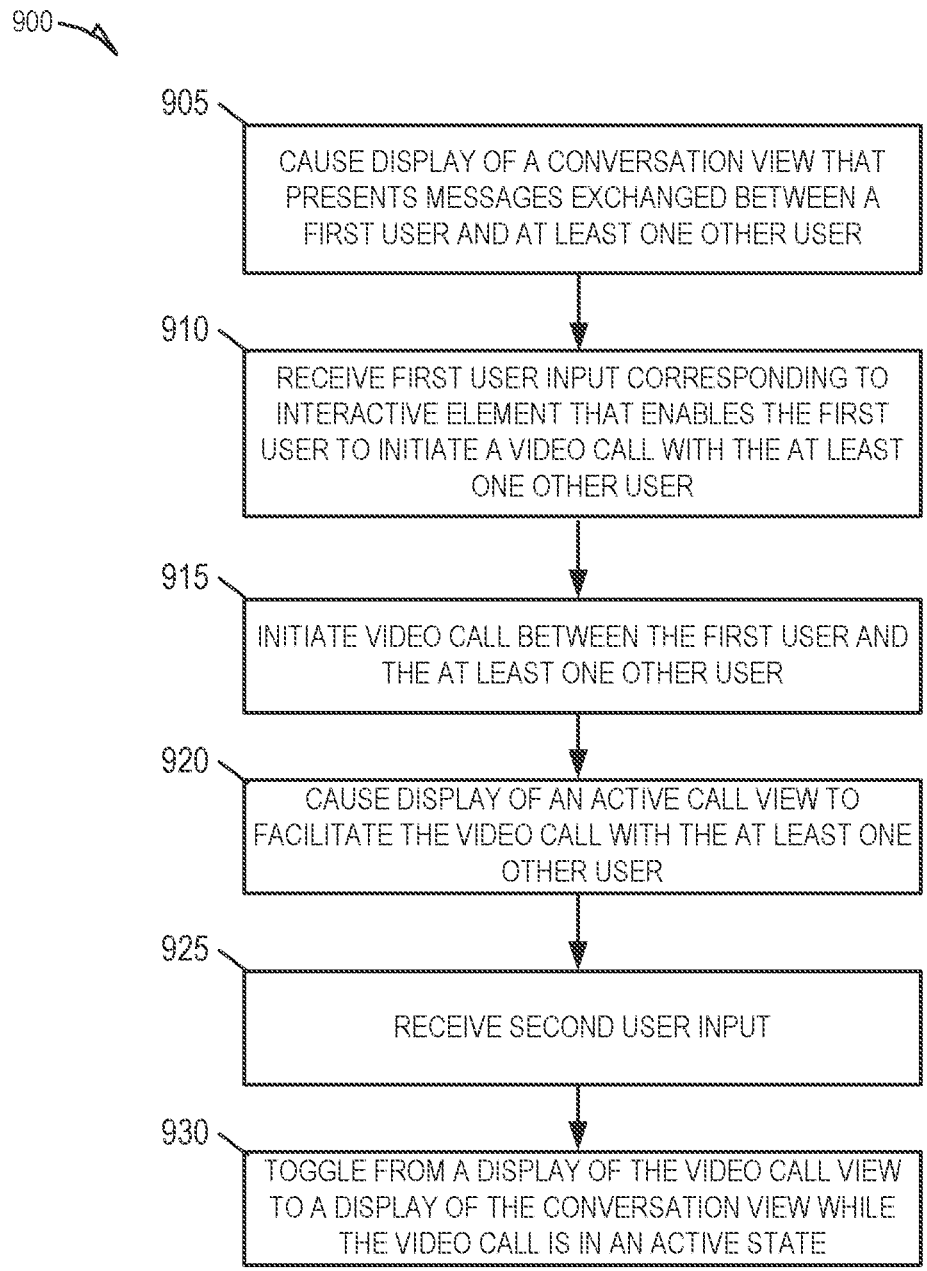
FIGS. 9-12 are flowcharts illustrating operations of the messaging system in performing a method for facilitating communication between multiple users via multiple modes of communication, according to example embodiments.

FIG. 6I illustrates further updates to the active call view 620 based on acceptance of the video call by additional users. As noted above, in updating the display of the active call view 620 based on additional users joining the video call, the messaging system 100 determines a row configuration (e.g., a number of rows and number of windows per row) based on a number of users who have joined the video call, determines a streaming video feed window height for each row based on display properties of the client device 102 on which the active call view 620 is displayed, and determines a position of each streaming video feed window based on an order of acceptance by the users who have joined the video call. As shown in FIG. 6I, the streaming video feed of any one of the users participating in the video call may be augmented with one or more visual effects, and the augmented streaming video feeds may be displayed within the active call view 620.

FIGS. 7A and 7B illustrate user status indicators provided by graphical representations of users. In particular, FIGS. 7A and 7B illustrate a graphical representation 702 of a first user, a graphical representation 704 of second user, and a graphical representation 706 of a third user. A manner in which each of the graphical representations is presented may provide an indicator of a status of the corresponding user. For example, as shown in FIG. 7A, each of the graphical representations 702, 704, and 706 is presented in an "expanded mode" in which the graphical representations 702, 704, and 706 are fully visible and are displayed in conjunction with identifiers of the corresponding users. In this state, the respective graphical representations 702, 704, and 706 may indicate that the status of the first, second, and third users is "active."

In comparison, in FIG. 7B the graphical representations 702 and 704 are presented in a "contracted mode" in which the graphical representations 702 and 704 are only partially visible as a portion of each appears to be obscured by an input bar. In this state, the respective graphical representations 702 and 704 may indicate that the first and second user are "inactive." The graphical representation 706 of the third user as presented in FIG. 7B is simply an indicator of the third user's initials, which may indicate that the status of the third user is "away." The designation of each user's status as "active," "inactive," or "away" may be based on whether the user has been inactive with respect to the messaging system for more than a first or second threshold period of time.

FIGS. 8A-8C are interface diagrams illustrating additional aspects of GUIs provided by the messaging system, according to example embodiments. In particular, FIGS. 8A-8C illustrate various notifications presented within a message feed 800. The message feed 800 is an example of the message feed 210. As shown, the message feed 800 includes indicators of ongoing chat conversations.

FIG. 8A illustrates an incoming call notification 802 ("Will is calling . . . ") presented in conjunction with an indicator of a chat conversation. In addition to providing a notification of the incoming call, the incoming call notification 802 also specifies an identifier of a user who initiated the call. The incoming call notification 802 may indicate an incoming voice or video call. FIG. 8B illustrates an active call notification 804 presented in conjunction with the indicator of the chat conversation. In addition to providing a notification that a call is active, the active call notification 804 also specifies identifiers of users who have joined the call. FIG. 8C illustrates a call termination notification 806 presented in conjunction with the indicator of the chat conversation.

FIGS. 9-12 are flowcharts illustrating operations of the messaging system in performing a method 900 for facilitating communication between multiple users via multiple modes of communication, according to example embodiments. The method 900 may be embodied in computer-readable instructions for execution by one or more processors such that the operations of the method 900 may be performed in part or in whole by the functional components of the messaging system 100; accordingly, the method 900 is described below by way of example with reference thereto. However, it shall be appreciated that at least some of the operations of the method 900 may be deployed on various other hardware configurations than the messaging system 100.

At operation 905, the messaging system 100 causes display of the conversation view 212 (e.g., the conversation view 600) on a display of a client device 102 associated with a first user. The conversation view 212 presents messages exchanged between the first user and at least one other user in an electronic chat conversation. The conversation view 212 comprises a first interactive element (e.g., a button) to enable the first user to trigger initiation of a video call with the at least one other user participating in the chat conversation.

The conversation view 212 may also include a graphical representation (e.g., an avatar) of one or more users participating in the electronic chat conversation. For example, a graphical representation of a second user may be presented within a graphical element presented within the conversation view 212 such as a bubble element. The graphical representation of the second user may be presented in conjunction with an identifier (e.g., name, user name, or account name) of the second user. As discussed in further detail above with reference to FIGS. 7A and 7B, the graphical representation of the second user may provide an indication of a status of the second user (e.g., active, inactive, or away).

At operation 910, the messaging system 100 receives a first user input corresponding to an interaction with the first interactive element that enables the first user to initiate the video call with the at least one other user participating in the chat conversation. For example, the messaging system 100 may receive user input indicative of a selection of a button that enables the first user to initiate the video call.

At operation 915, the messaging system 100 initiates the video call between the first user and the at least one other user. The initiating of the video call may include providing a notification of an incoming call to the at least one other user participating in the chat conversation. A notification of the incoming call may also allow a user to accept or deny the incoming video call. Further details regarding the initiating of the video call between the first user and the at least one other user are discussed below in reference to FIG. 10.

At operation 920, the messaging system 100 causes display of an active call view 214 (e.g., the active call view 620) on the client device 102 of the first user to facilitate the video call between the first user and the at least one other user. The messaging system 100 may cause display of the active call view 214 on the client device 102 of the first user in response to detecting acceptance of the video call by a second user (e.g., based on receiving input indicative of an interaction of the second user with an interactive element that allows the second user to accept the video call).

The video call allows the first user to communicate with one or more others in real time. The messaging system 100 facilitates the video call by obtaining audio-video signals produced by client devices 102 of the other users and transmitting these audio-video signals to the client device 102 of the first user. Accordingly, the active call view 214 includes a streaming video feed of each user who accepts the video call along with a streaming video feed of the first user. For example, the active call view 214 may include a streaming video feed of a second user based on an acceptance of the video call by the second user.

The displaying of the active call view 214 may include determining a row configuration based on a number of participants in the video call. The row configuration specifies a number of rows and a number of streaming video feeds for each row. The messaging system 100 may determine a position of each streaming video feed within the active call view 214 based on the order in which users accept the video call. Each user's streaming video feed is presented within a streaming video feed window within the active call view 214, and the displaying of the active call view 214 may further include determining a height of each streaming video feed window based on display properties (e.g., aspect ratio or screen size) of the client device 102 of the first user. In some embodiments, the messaging system 100 determines the height of each streaming video feed window on a per row basis, meaning that streaming video feed windows in the same row may be the same size.

At operation 925, the messaging system 100 receives a second user input corresponding to a request to toggle from displaying the active call view 214 to the conversation view 212. For example, the active call view 214 may include a second interactive element (e.g., a drop-down carat) that enables the first user to toggle from displaying the active call view 214 to the conversation view 212. In another example, the second user input may include a gesture (e.g., a touch screen gesture such as a swipe) that is indicative of the request to toggle from displaying the active call view 214 to the conversation view 212.

At operation 930, the messaging system 100 toggles from the display of the active call view 214 to the display of the conversation view 212 while the video call is in an active state based on receiving the second user input. While the video call is active, streaming video feeds of users who have accepted the video call are presented in place of the graphical representations of users within the conversation view 212. For example, the graphical representation of a second user previously presented within the conversation view 212 may be replaced within a streaming video feed of the second user while the video call is active, assuming that the second user has accepted the video call.

In toggling from the display of the active call view 214 to the display of the conversation view 212, the messaging system 100 may cause display of an animation of a transition of a streaming video feed of a second user from being displayed in a first interface element within the active call view 214 to being displayed in a second interface element within the conversation view 212. For example, the messaging system 100 may cause the client device 102 to display an animation of a transition of the streaming video feed of a second user from being displayed within a streaming video feed window within the active call view 214 to being displayed in a bubble element in the conversation view 212 in place of the graphical representation of the second user.

Figure 10:
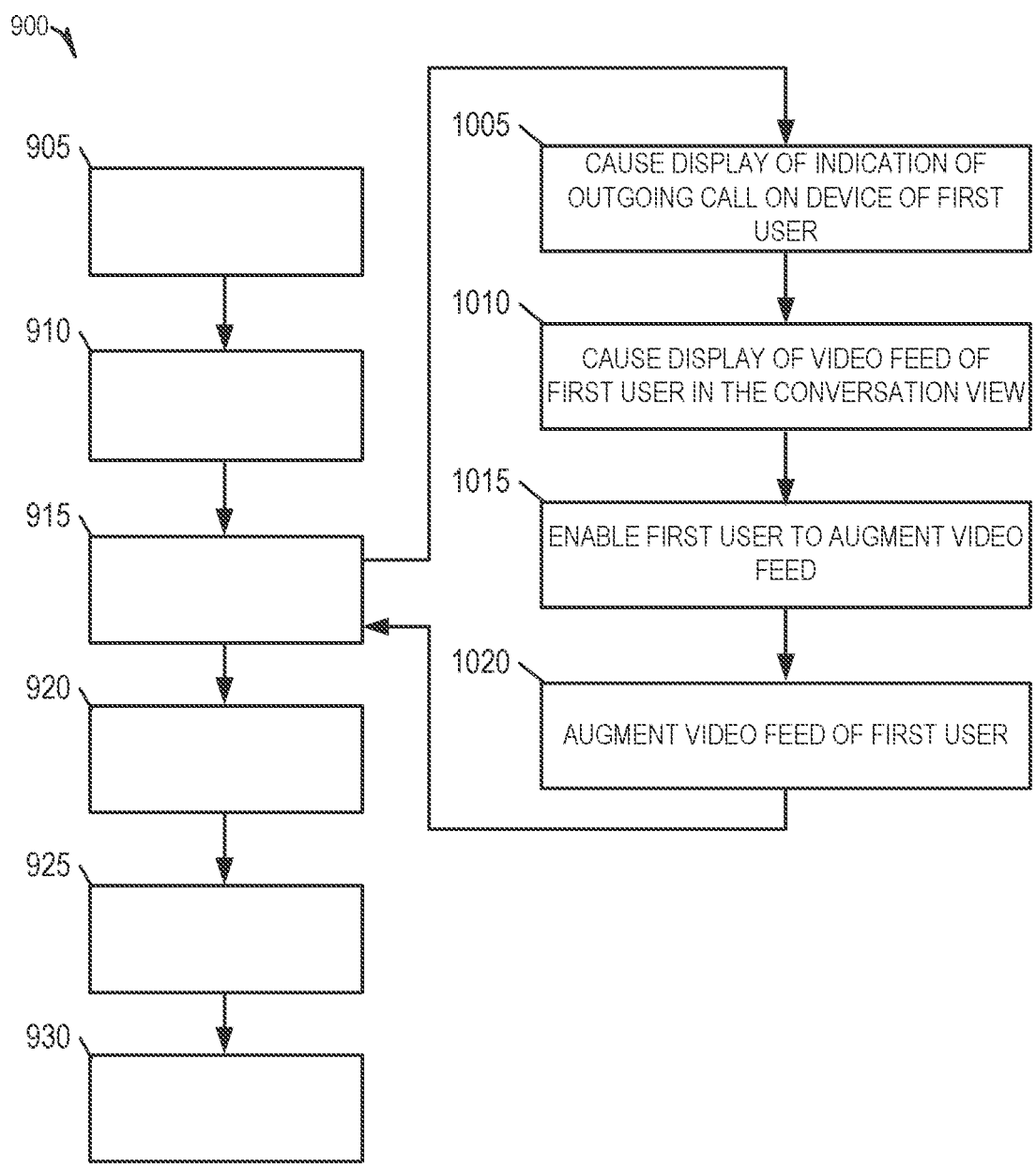

As shown in FIG. 10, the method 900 may further include operations 1005, 1010, 1015, and 1020, in some embodiments. Consistent with these embodiments, the operations 1005, 1010, 1015, and 1020 may be performed as part of the operation 915, where the messaging system 100 initiates the video call.

At operation 1005, the messaging system 100 causes display of an indication of an outgoing video call within the conversation view 212 presented on the client device 102 of the first user. The indication may include a textual indication of the outgoing video call.

At operation 1010, the messaging system 100 causes display of a streaming video feed of the first user within the conversation view 212 (e.g., as shown in FIG. 6B). The streaming video feed of the first user may, for example, be presented within or in conjunction with an input bar that enables the first user to author and submit messages as part of the chat conversation.

At operation 1015, the messaging system 100 enables the first user to augment his or her streaming video feed with one or more visual effects. For example, upon receiving input indicative of a user selection of the streaming video feed of the first user, the messaging system 100 may enlarge the display of the streaming video feed of the first user within the conversation view 212 and present the first user with one or more visual effects for selection (e.g., as shown in FIG. 6C).

Upon receiving a selection of one of the visual effects, the messaging system 100 augments the streaming video feed of the first user in accordance with the selected visual effect, at operation 1020 (e.g., as shown in FIG. 6C). The augmented streaming video feed of the first user may then be presented by the messaging system 100 to a second user participating in the chat conversation upon the messaging system 100 detecting acceptance of the video call by the second user.

Figure 11:
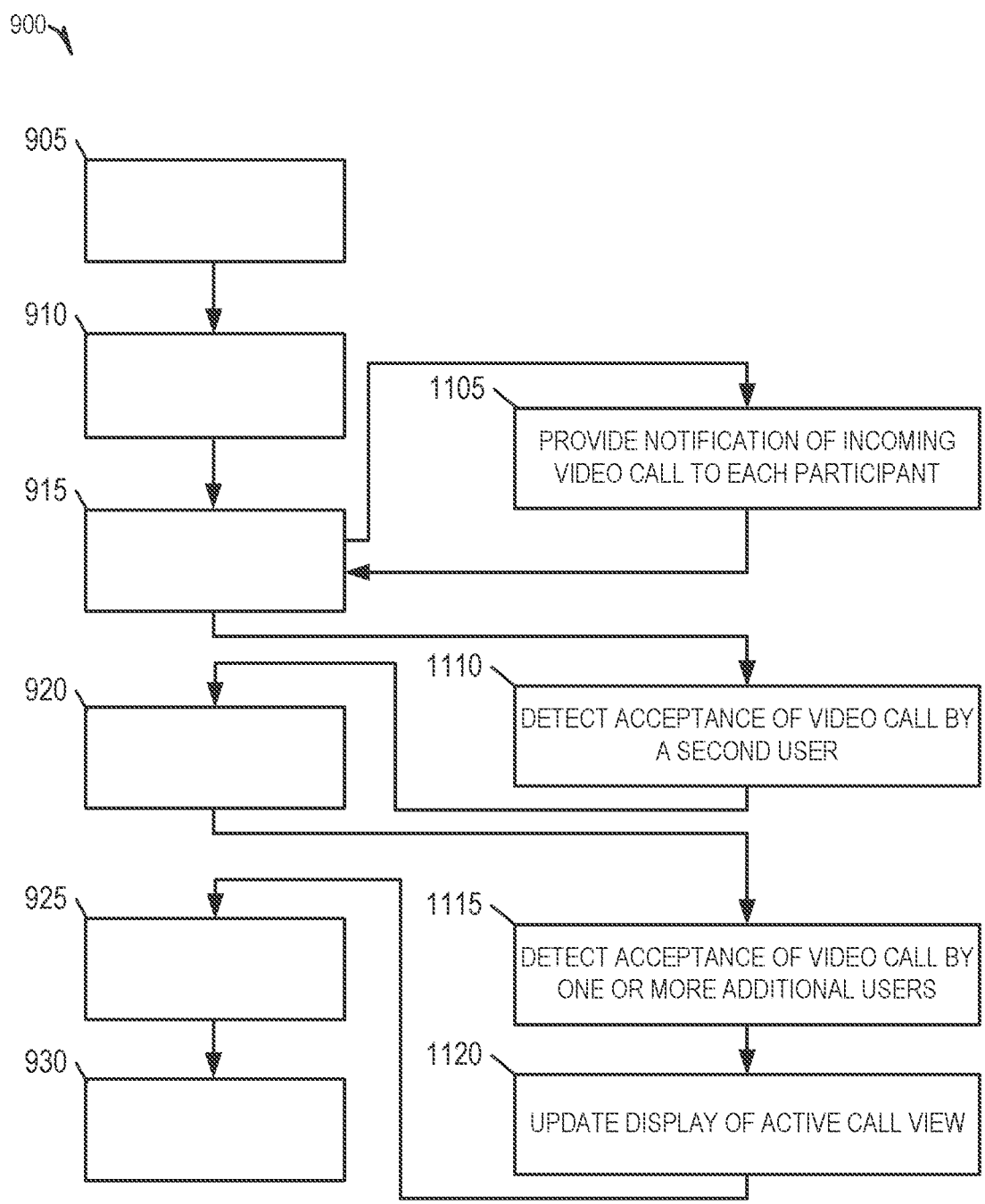

As shown in FIG. 11, the method 900 may further include operations 1105, 1110, 1115, and 1120, in some embodiments. The operation 1105 may be performed as part of the operation 915, where the messaging system 100 initiates the video call. At operation 1105, the messaging system 100 provides a notification of an incoming call to each user participating in the chat conversation. For example, the messaging system 100 may cause a notification of the incoming call to be displayed in conjunction with an indicator of the chat conversation presented in a message feed 210 presented on a client device 102 of a second user (e.g., as shown in FIG. 8A). In another example, the messaging system 100 may cause the notification of the incoming call to be displayed within a conversation view 212 presented on the client device 102 of the second user. In some embodiments, the providing of the notification of the incoming call comprises causing an animation of a graphical representation of the first user within a conversation view 212 presented on the client device 102 of the second user. The animation may, for example, include the graphical representation of the first user performing an action that signals an incoming call such as the graphical representation of the first user holding or otherwise using a telephone.

The notification of the incoming call may also allow the second user to accept or deny the incoming video call. For example, in instances in which the notification is displayed within the message feed 210 of the second user, the second user may accept the video call by accessing the chat conversation through selection of the corresponding indicator of the chat conversation. As another example, in instances in which the notification is displayed within the conversation view 212 of the second user, the notification may include interactive elements (e.g., buttons) that enable the user to either accept or decline the video call (e.g., by selecting the corresponding button).

Consistent with these embodiments, the operation 1110 may be performed subsequent to the operation 915, where the messaging system 100 initiates the video call. At operation 1110, the messaging system 100 detects acceptance of the video call by the second user. For example, the messaging system 100 may receive user input indicative of an interaction of the second user with an interactive element included in the notification of the incoming call that allows the second user to accept the video call. As noted above, the messaging system 100 may cause display of the active call view 214 in response to detecting acceptance of the video call by the second user.

As shown, the operations 1115 and 1120 may be performed subsequent to operation 920, where the messaging system 100 causes display of the active call view 214 based on detecting acceptance of the video call by at least the second user. At operation 1115, the messaging system 100 detects acceptance of the video call by one or more additional users. For example, the messaging system 100 may receive user input indicative of an acceptance of the video call by the one or more additional users (e.g., a user interaction with an interactive element included in a notification of the incoming call).

At operation 1120, the messaging system 100 updates the display of the active call view 214 based on detecting acceptance of the video call by the one or more additional users. The messaging system 100 may update the display of the active call view 214 to include one or more streaming video feeds corresponding to the one or more additional users. The messaging system 100 may further update the display of the active call view 214 by reducing a size of the streaming video feed window that displays the streaming video feed of the second user. Further details regarding the updating of the display of the active call view 214 are discussed below in reference to FIG. 12.

Figure 12:
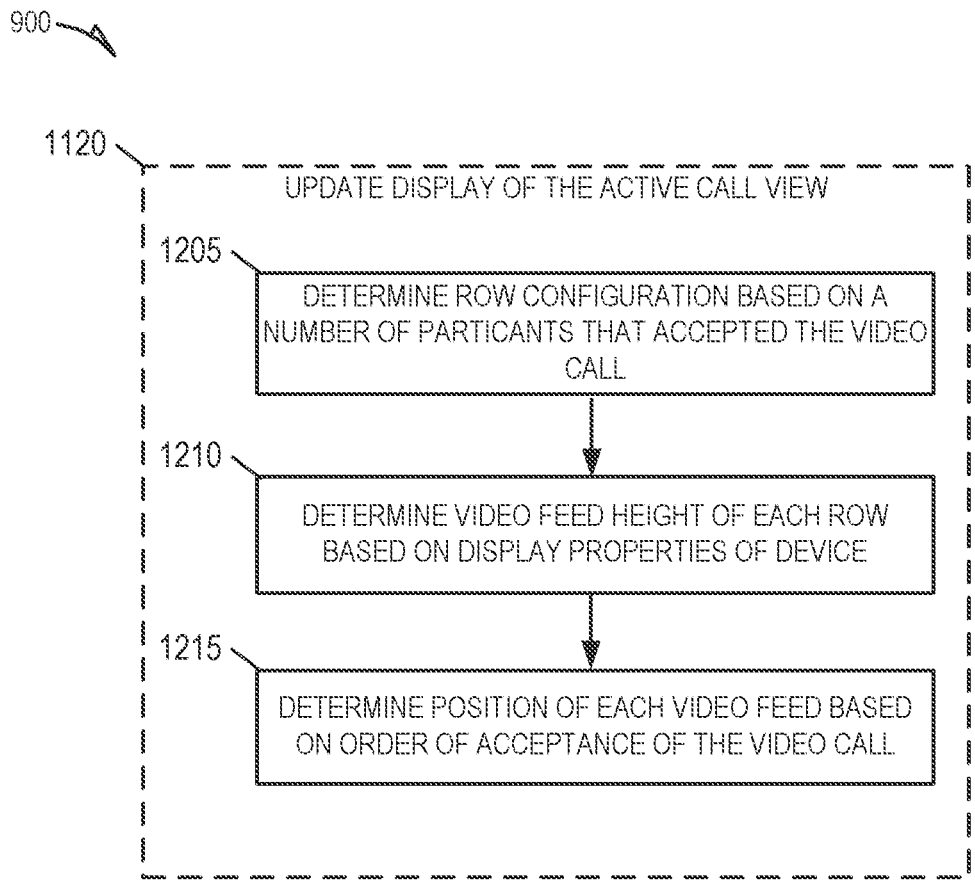

As shown in FIG. 12, the method 900 may, in some embodiments, include operations 1205, 1210, and 1215. The operations 1205, 1210, and 1215 may be performed as part of the operation 1120 where the messaging system 100 updates the display of the active call view 214.

At operation 1205, the messaging system 100 determines a row configuration for the active call view 214 based on a number of participants in the video call. The row configuration specifies a number of rows and a number of streaming video feeds for each row. The messaging system 100 may determine the row configuration via a weighted average calculation. More specifically, the messaging system 100 may determine a plurality of candidate row configurations (e.g., every possible row configuration assuming a uniform streaming video feed window size). For example, in an active call view 214 with four streaming video feed windows (e.g., a video call between a first user and four other participants) the possible configurations are one row of four; one row of three and one row of one; two rows of two; two rows of one and one row of two; and four rows of one. The messaging system 100 may compute a weighted average score for each candidate row configuration based on individual streaming video feed window areas and aspect ratios. The messaging system 100 selects the candidate row configuration with the lowest weighted average score as the row configuration.

At operation 1210, the messaging system 100 determines a height of streaming video feed windows in each row based on display properties (e.g., screen size) of the client device 102 of the first user. The messaging system 100 may determine the height of streaming video feed windows in each row such that the overall weighted score for the row configuration is minimized. For example, the messaging system 100 may find the row heights that result in the lowest minimum overall weighted score by varying the height of each row while ensuring that the sum equals the screen height. In determining the height of streaming video feed windows in each row, the messaging system 100 may treat rows with the same number of streaming video feed windows the same. For example, if there is a row configuration in which there are two rows each having two streaming video feed windows, the two rows will be the same height.

At operation 1215, the messaging system 100 determines a position of each streaming video feed window within the active call view 214 based on the order in which users accept the video call. For example, the messaging system 100 may position streaming video feed windows from left to right then top to bottom starting with the streaming video feed window corresponding to the most recently joined user.

Software Architecture

Figure 13:
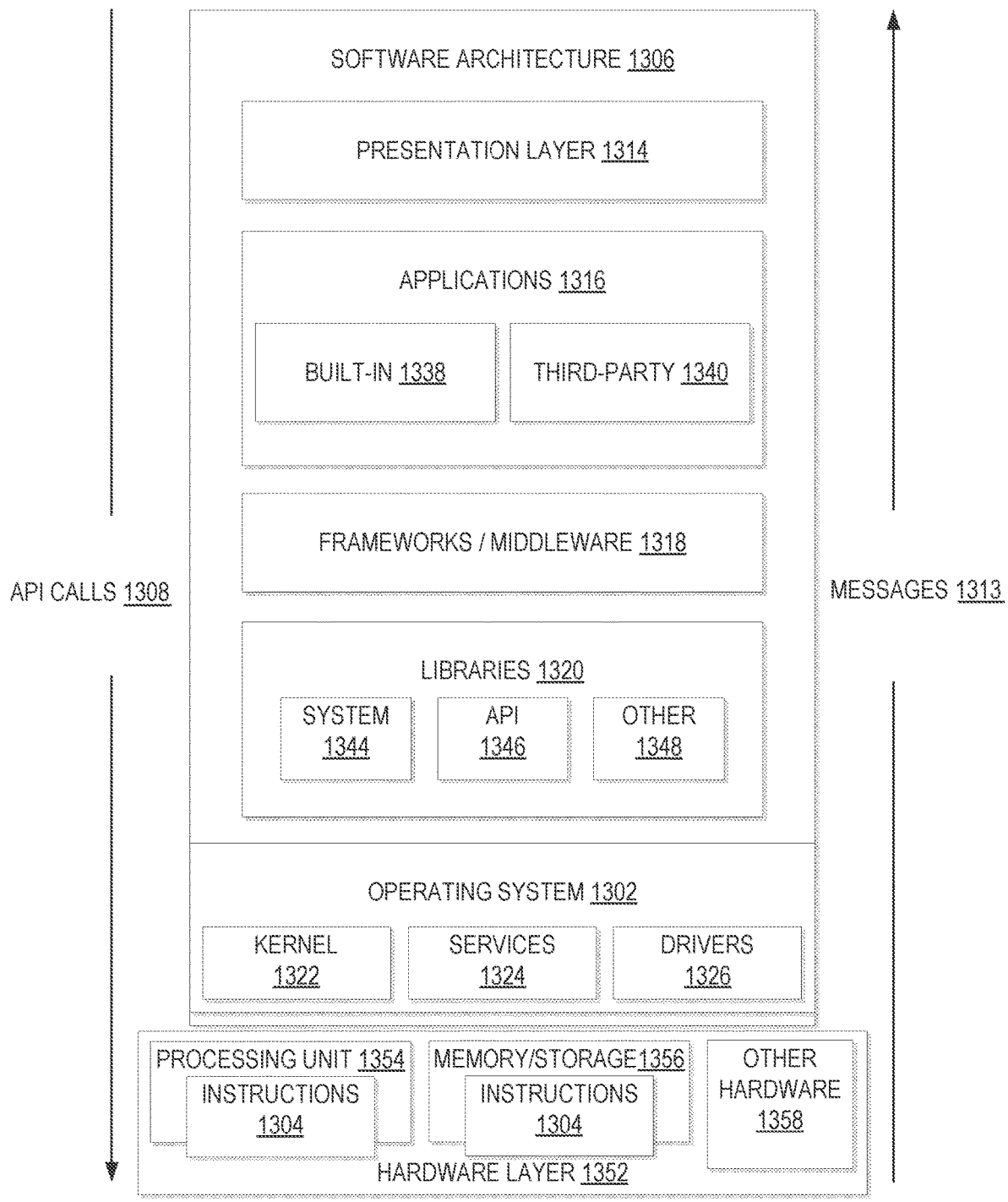
FIG. 13 is a block diagram illustrating a representative software architecture, which may be used in conjunction with various hardware architectures herein described, according to example embodiments.

FIG. 13 is a block diagram illustrating an example software architecture 1306, which may be used in conjunction with various hardware architectures herein described. FIG. 13 is a non-limiting example of a software architecture, and it will be appreciated that many other architectures may be implemented to facilitate the functionality described herein. The software architecture 1306 may execute on hardware such as a machine 1400 of FIG. 14 that includes, among other things, processors 1404, memory/storage 1406, and I/O components 1418. A representative hardware layer 1352 is illustrated and can represent, for example, the machine 1400 of FIG. 14. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes memory and/or storage modules 1356, which also have the executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1316, and a presentation layer 1314. Operationally, the applications 1316 and/or other components within the layers may invoke application programming interface (API) calls 1308 through the software stack and receive a response to the API calls 1308 as messages 1313. The layers illustrated are representative in nature and not all software architectures have all layers. For example, some mobile or special-purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than by interfacing directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H.2134, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1316 may use built-in operating system functions (e.g., kernel 1322, services 1324, and/or drivers 1326), libraries 1320, and frameworks/middleware 1318 to create user interfaces to interact with users of the system. Alternatively, or additionally, in some systems interactions with a user may occur through a presentation layer, such as the presentation layer 1314. In these systems, the application/component "logic" can be separated from the aspects of the application/component that interact with a user.

Figure 14:
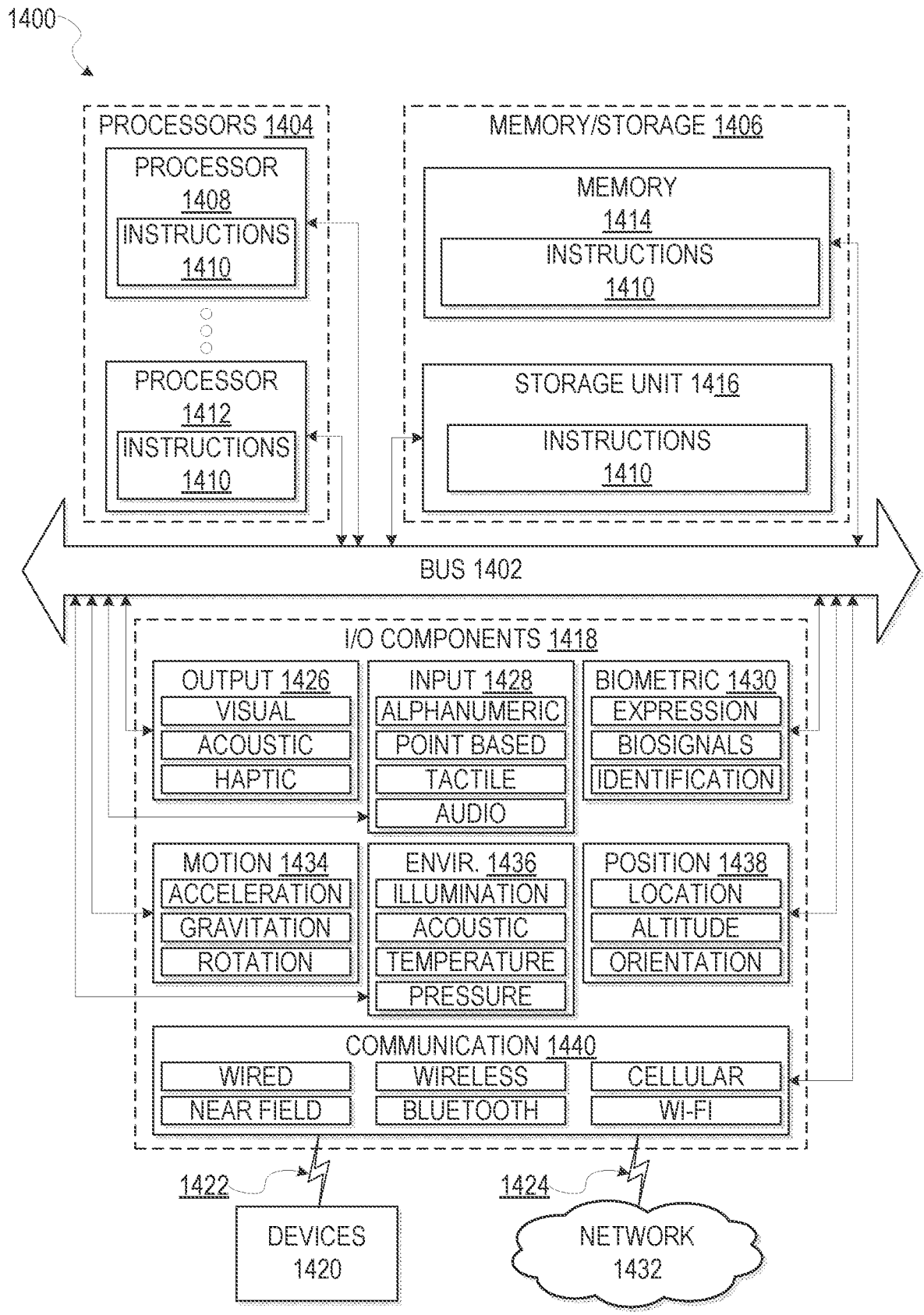
FIG. 14 is a block diagram illustrating components of a machine able to read instructions from a machine-readable medium (e.g., a machine-readable storage medium) and perform any one or more of the methodologies discussed herein, according to example embodiments.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory/storage 1406, and I/O components 1418, which may be configured to communicate with each other such as via a bus 1402. In an example embodiment, the processors 1404 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1408 and a processor 1412 that may execute the instructions 1410. Although FIG. 14 shows multiple processors, the machine 1400 may include a single processor with a single core, a single processor with multiple cores (e.g., a multi-core processor), multiple processors with a single core, multiple processors with multiple cores, or any combination thereof.

The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of the processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion, and the grouping is in no way limiting. In various example embodiments, the I/O components 1418 may include output components 1426 and input components 1428. The output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environment components 1436, or position components 1438, among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via a coupling 1424 and a coupling 1422, respectively. For example, the communication components 1440 may include a network interface component or other suitable device to interface with the network 1432. In further examples, the communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus (USB)).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   causing, by one or more hardware processors, display, on a user device associated with a first user, of an active call view to facilitate a video call between the first user and at least one other user, the active call view comprising a real-time streaming video feed of a second user;
   updating the active call view to display a real-time streaming video feed of a third user, the updating of the active call view comprising changing a size of the real-time streaming video feed of the second user; and
   based on receiving a input indicative of a request from the first user to toggle from displaying the active call view to displaying a conversation view, causing the user device to switch from displaying the active call view to displaying the conversation view while the video call remains in an active state, the conversation view, while the video call remains in the active state, comprising a presentation of one or more messages exchanged between the first user and the second user in an electronic chat conversation, the active call view being distinct from the conversation view.

2. The method of claim 1, further comprising:
detecting an acceptance of the video call by the third user, wherein the updating of the active call view to display the real-time streaming video feed of the third user is in response to detecting the acceptance of the video call by the third user.

3. The method of claim 2, wherein the updating of the active call view comprises determining a row configuration for the active call view based on a number of participants in the video call, the row configuration specifying a number of rows and a number of streaming video feeds for each row.

4. The method of claim 3, wherein the updating of the active call view comprises determining a streaming video feed window height of each row based on one or more display properties of the user device.

5. The method of claim 4, wherein the changing of the size of the real-time streaming video feed of the second user in the active call view is based on the streaming video feed window height.

6. The method of claim 1, wherein:
the user device is a first user device; and
the method further comprises initiating the video call with the at least one other user by causing a second user device associated with the second user to display a notification of an incoming video call.

7. The method of claim 6, wherein the notification of the incoming video call is presented within a message feed comprising one or more indicators of electronic chat conversations in which the second user is a participant.

8. The method of claim 1, further comprising causing display, within the active call view, of a text-based message overlaid on the real-time streaming video feed of the second user.

9. A system comprising:
one or more processors of a server; and
at least one computer-readable memory coupled to the one or more processors and storing instructions that, when executed by the one or more processors, cause the server to perform operations comprising:
causing display, on a user device associated with a first user, of an active call view to facilitate a video call between the first user and at least one other user, the active call view comprising a real-time streaming video feed of at least a second user;
updating the active call view to display a real-time streaming video feed of a third user, the updating of the active call view comprising changing a size of the real-time streaming video feed of the second user; and
based on receiving a input indicative of a request from the first user to toggle from displaying the active call view to displaying a conversation view, causing the user device to switch from displaying the active call view to displaying the conversation view while the video call remains in an active state, the conversation view, while the video call remains in the active state, comprising a presentation of one or more messages exchanged between the first user and the second user in an electronic chat conversation, the active call view being distinct from the conversation view.

10. The system of claim 9, wherein the operations further comprise:
detecting an acceptance of the video call by the third user, wherein the updating of the active call view to display the real-time streaming video feed of the third user is in response to detecting the acceptance of the video call by the third user.

11. The system of claim 10, wherein the updating of the active call view comprises determining a row configuration for the active call view based on a number of participants in the video call, the row configuration specifying a number of rows and a number of streaming video feeds for each row.

12. The system of claim 10, wherein the updating of the active call view comprises determining a streaming video feed window height of each row based on one or more display properties of the user device, wherein the streaming video feed window height of the real-time streaming video feed of the second user is based on the determined streaming video feed window height of each row.

13. The system of claim 12, wherein the changing of the size of the real-time streaming video feed of the second user in the active call view is based on the streaming video feed window height.

14. The system of claim 9, wherein:
the user device is a first user device; and
the operations further comprise initiating the video call with the at least one other user by causing a second user device associated with the second user to display a notification of an incoming video call.

15. The system of claim 14, wherein the notification of the incoming video call is presented within a message feed comprising one or more indicators of electronic chat conversations in which the second user is a participant.

16. The system of claim 9, further comprising causing display, within the active call view, of a text-based message overlaid on the real-time streaming video feed of the second user.

17. A non-transitory computer-readable medium storing instructions that, when executed by a computer system, cause the computer system to perform operations comprising:
causing, by one or more hardware processors, display, on a user device associated with a first user, of an active call view to facilitate a video call between the first user and at least one other user, the active call view comprising a real-time streaming video feed of at least a second user;
updating the active call view to display a real-time streaming video feed of a third user, the updating of the active call view comprising changing a size of the real-time streaming video feed of the second user; and
based on receiving a input indicative of a request from the first user to toggle from displaying the active call view to displaying a conversation view, causing the user device to switch from displaying the active call view to displaying the conversation view while the video call remains in an active state, the conversation view, while the video call remains in the active state, comprising a presentation of one or more messages exchanged between the first user and the second user in an electronic chat conversation, the active call view being distinct from the conversation view.

18. The non-transitory computer-readable medium of claim 17, wherein the operations further comprise:
detecting an acceptance of the video call by the third user, wherein the updating of the active call view to display the real-time streaming video feed of the third user is in response to detecting the acceptance of the video call by the third user.

19. The non-transitory computer-readable medium of claim 18, wherein the updating of the active call view further comprises determining a row configuration for the active call view based on a number of participants in the video call, the row configuration specifying a number of rows and a number of streaming video feeds for each row.

20. The non-transitory computer-readable medium of claim 18, wherein the updating of the active call view comprises:
   determining a streaming video feed window height of each row based on one or more display properties of the user device, wherein the streaming video feed window height of the real-time streaming video feed of the second user is based on the determined streaming video feed window height of each row, wherein the changing of the size of the streaming video feed of the second user in the active call view is based on the determined streaming video feed window height.

* * * * *

UNITED STATES PATENT AND TRADEMARK OFFICE
CERTIFICATE OF CORRECTION

| | | |
|---|---|---|
| PATENT NO. | : 12,273,656 B2 | Page 1 of 1 |
| APPLICATION NO. | : 18/481139 | |
| DATED | : April 8, 2025 | |
| INVENTOR(S) | : Eirinberg et al. | |

It is certified that error appears in the above-identified patent and that said Letters Patent is hereby corrected as shown below:

On the Title Page

On page 2, in Column 2, under "Other Publications", Line 26, delete "Faceitate" and insert --Facilitate-- therefor On page 2, in Column 2, under "Other Publications", Line 29, delete "Faceitate" and insert --Facilitate-- therefor On page 2, in Column 2, under "Other Publications", Line 32, delete "Faceitate" and insert --Facilitate-- therefor Signed and Sealed this
Twenty-first Day of October, 2025

John A. Squires
*Director of the United States Patent and Trademark Office*